US006789997B2

(12) United States Patent
Coblentz

(10) Patent No.: US 6,789,997 B2
(45) Date of Patent: Sep. 14, 2004

(54) METHOD AND APPARATUS FOR PALLET REMOVAL CARGO QUEUING AND STOWAGE OF STACKS OF CARTONS OF FROZEN ANIMAL PRODUCTS

(75) Inventor: W. Sam Coblentz, Germantown, TN (US)

(73) Assignee: Stevedoring Services of America, Inc., Seattle, WA (US)

( * ) Notice: Subject to any disclaimer, the term of this patent is extended or adjusted under 35 U.S.C. 154(b) by 0 days.

(21) Appl. No.: 10/421,519

(22) Filed: Apr. 23, 2003

(65) Prior Publication Data

US 2003/0156926 A1 Aug. 21, 2003

Related U.S. Application Data

(63) Continuation-in-part of application No. 10/268,182, filed on Oct. 9, 2002, now Pat. No. 6,622,854, which is a continuation-in-part of application No. 09/712,741, filed on Nov. 13, 2000, now abandoned, which is a continuation-in-part of application No. 09/303,792, filed on Apr. 30, 1999, now abandoned, which is a continuation-in-part of application No. 09/093,461, filed on Jun. 8, 1998, now Pat. No. 5,980,198.

(51) Int. Cl.$^7$ .............................................. B65G 67/08
(52) U.S. Cl. ..................................................... 414/803
(58) Field of Search ................................ 414/659, 661, 414/814, 803, 142.8, 142.7, 143.2

(56) References Cited

U.S. PATENT DOCUMENTS

| 260,924 A | | 7/1882 | Bacci | |
|---|---|---|---|---|
| 1,522,707 A | * | 1/1925 | Andrews et al. | ............ 414/803 |
| 1,808,873 A | | 6/1931 | Weeks | |
| 1,939,037 A | | 12/1933 | Bogert | |
| 2,256,453 A | * | 9/1941 | Bomar | ........................ 414/661 |
| 2,509,023 A | | 5/1950 | Vogel et al. | |
| 2,593,494 A | | 4/1952 | Seward | |
| 2,671,571 A | | 3/1954 | Gerhardt | |
| 2,782,066 A | | 2/1957 | Lord | |
| 2,808,157 A | * | 10/1957 | Terrill | ......................... 414/347 |
| 2,890,807 A | | 6/1959 | Parcell | |
| 2,988,036 A | | 6/1961 | Mooneyhan et al. | |
| 3,332,716 A | * | 7/1967 | Gridley | ..................... 294/67.2 |
| 3,370,880 A | | 2/1968 | Carliss et al. | |
| 3,389,775 A | * | 6/1968 | Sause, Jr. | .................... 198/633 |
| 3,412,876 A | | 11/1968 | Calabrese | |
| 3,421,641 A | * | 1/1969 | Frey | ........................ 414/744.6 |
| 3,430,585 A | | 3/1969 | Grant et al. | |
| 3,433,376 A | | 3/1969 | Jordan | |
| 3,687,300 A | | 8/1972 | Anderson | |
| 3,946,880 A | * | 3/1976 | Schmitt | .................... 414/795.9 |
| 3,971,584 A | | 7/1976 | Duncan | |
| 4,124,126 A | | 11/1978 | Abraham | |
| 4,158,416 A | | 6/1979 | Podesta | |

(List continued on next page.)

FOREIGN PATENT DOCUMENTS

FR             1272331         8/1961

*Primary Examiner*—Douglas Hess
(74) *Attorney, Agent, or Firm*—Dowrey Richards PLLC

(57) ABSTRACT

A method for rapid depalletizing and lifting of stacks of cartons aboard vessels is provided which may include sliding the stacks of cartons from a pallet onto a transport surface at a loading end, moving the stack of cartons along the transport surface to a lifting station having fork channels extending across the lifting station for receiving the blades of a load push lift truck, and lifting the stack of cartons from the lifting station. The transport surface may comprise a plurality of rollers. The stack of cartons may be lifted by cargo slings into the hold of a ship, or lifted from the lifting end on the blades of a load push lift truck. The pallet may be retained on the blades of a load push lift truck while the stack of cartons carried by the pallet is pushed from the pallet by a restraint. The empty pallet may then be carried to and deposited in a pallet accumulation location by the lift truck.

20 Claims, 20 Drawing Sheets

U.S. PATENT DOCUMENTS

| | | | |
|---|---|---|---|
| 4,160,617 A | | 7/1979 | Montgomery et al. |
| 4,185,944 A | | 1/1980 | Seaberg |
| 4,279,564 A | | 7/1981 | Weinert |
| 4,325,667 A | | 4/1982 | Freeman |
| 4,439,093 A | * | 3/1984 | Victorino .................... 414/801 |
| 4,543,035 A | * | 9/1985 | Lair ........................... 414/802 |
| 4,556,359 A | | 12/1985 | Sinclair |
| 4,606,690 A | | 8/1986 | Svendsen |
| 4,619,579 A | | 10/1986 | Frison |
| 4,640,657 A | | 2/1987 | Moore et al. |
| 4,642,020 A | | 2/1987 | Sinclair |
| 4,660,404 A | | 4/1987 | Rugh et al. |
| 4,694,962 A | | 9/1987 | Taub |
| 4,737,069 A | | 4/1988 | Coblentz |
| 4,752,179 A | | 6/1988 | Seaberg |
| 4,850,283 A | | 7/1989 | Carvin |
| 4,890,973 A | | 1/1990 | Frison et al. |
| 4,972,782 A | | 11/1990 | Shepherd et al. |
| 5,118,243 A | * | 6/1992 | Huebner et al. ............ 414/404 |
| 5,144,897 A | | 9/1992 | Avery |
| 5,161,934 A | | 11/1992 | Richardson |
| 5,205,410 A | | 4/1993 | Kuipers et al. |
| 5,209,629 A | * | 5/1993 | Rasmussen .................. 414/772 |
| 5,482,426 A | | 1/1996 | White |
| 5,525,030 A | | 6/1996 | Buchman |
| 5,567,112 A | | 10/1996 | Balzano |
| 5,582,499 A | * | 12/1996 | White ..................... 414/16.04 |
| 5,599,153 A | | 2/1997 | Svensson |
| 5,647,725 A | * | 7/1997 | Kraus et al. ................. 414/799 |
| 5,788,461 A | | 8/1998 | Easton et al. |
| 5,915,905 A | * | 6/1999 | Hopland .................. 414/139.4 |
| 5,918,745 A | | 7/1999 | Main |
| 5,972,464 A | | 10/1999 | Pezzuco |
| 5,980,198 A | * | 11/1999 | Coblentz .................... 414/803 |
| 6,082,947 A | | 7/2000 | Adamson |
| 6,267,255 B1 | | 7/2001 | Brush |
| 6,360,676 B1 | * | 3/2002 | Schepers ................... 108/52.1 |
| 6,375,407 B1 | * | 4/2002 | Coblentz .................... 414/803 |
| 6,622,854 B2 | * | 9/2003 | Coblentz .................... 414/803 |

* cited by examiner

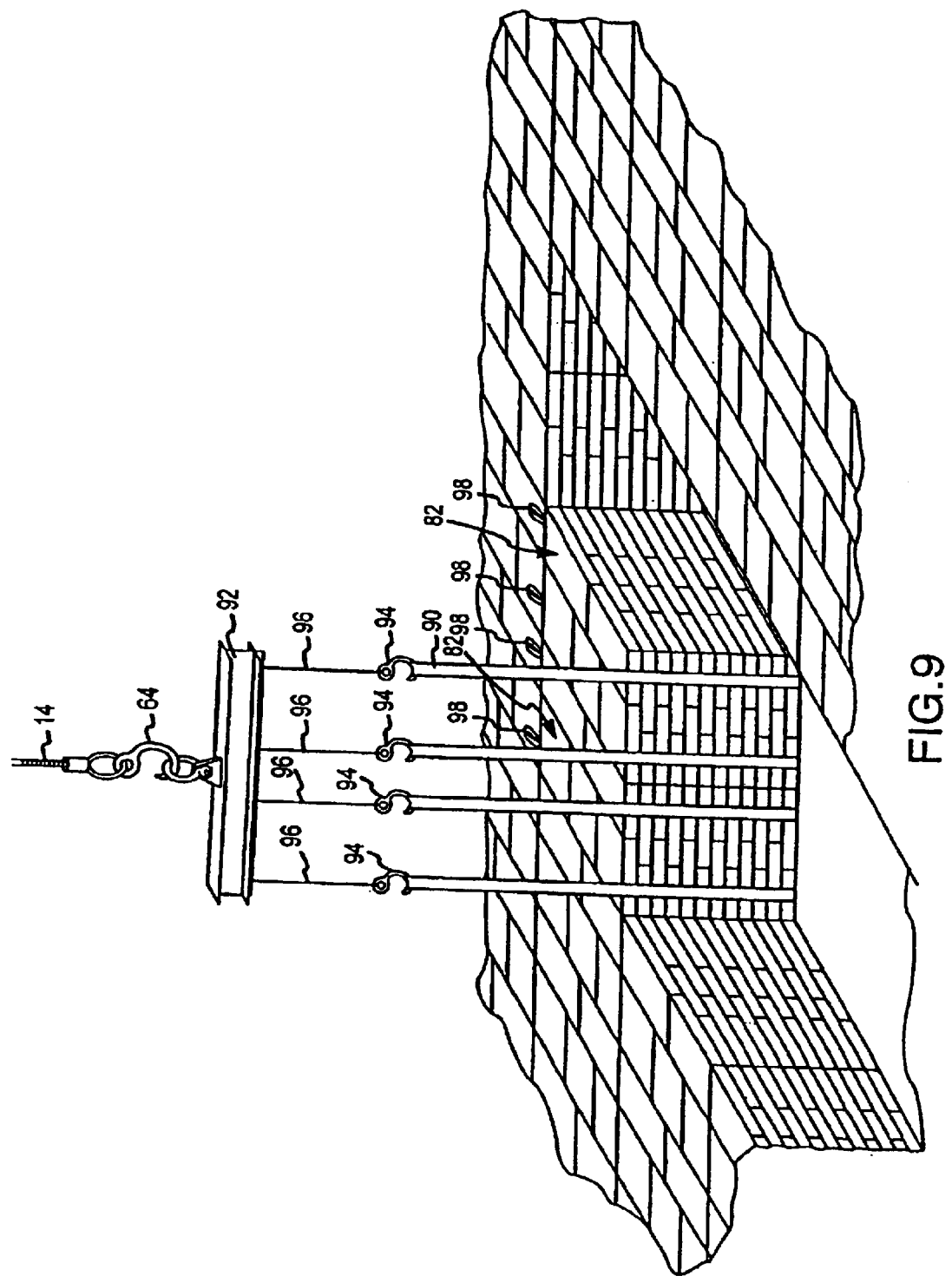

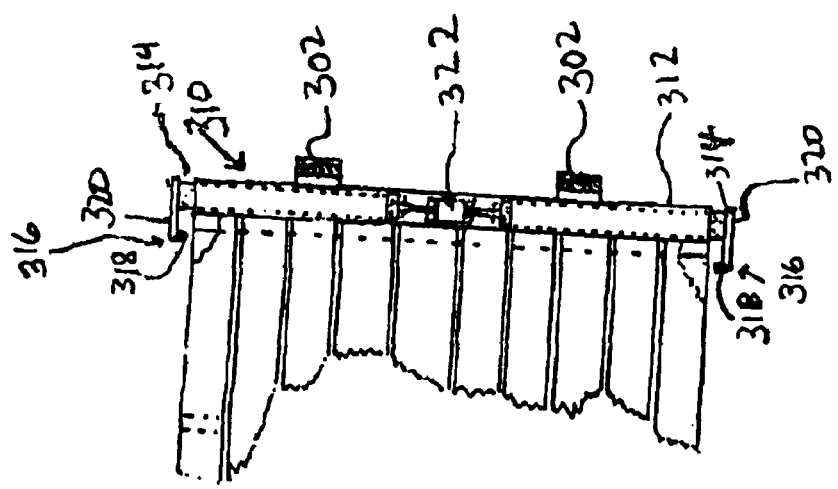
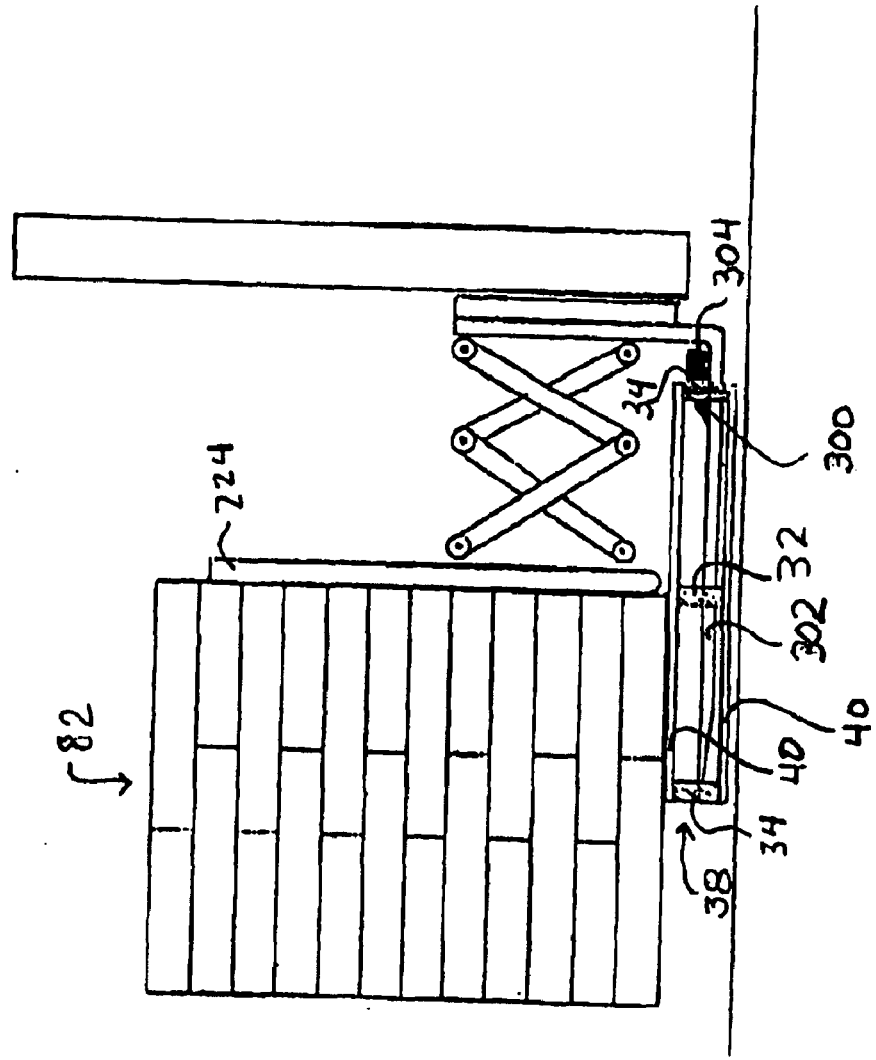
Fig. 30
Fig. 28

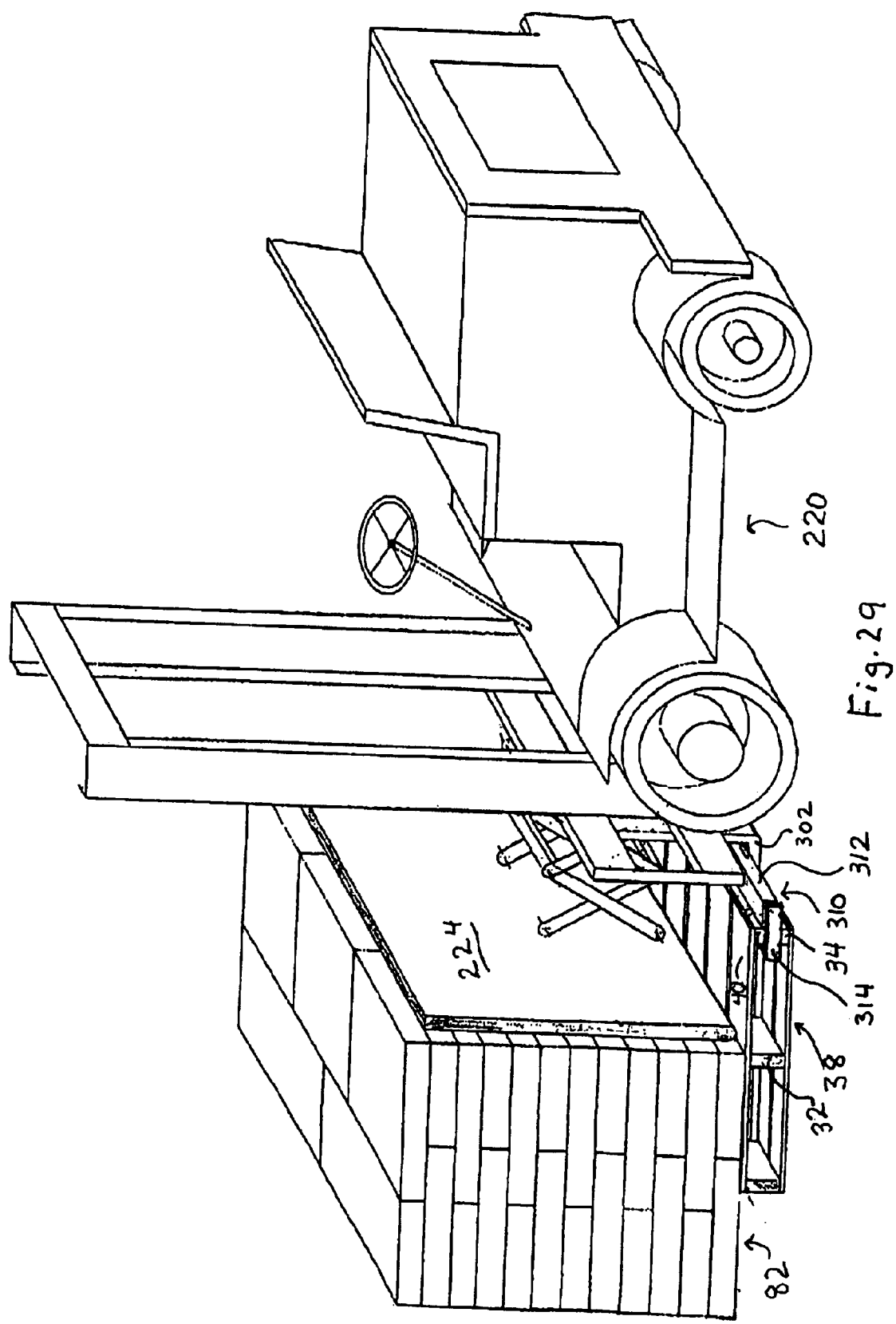

METHOD AND APPARATUS FOR PALLET REMOVAL CARGO QUEUING AND STOWAGE OF STACKS OF CARTONS OF FROZEN ANIMAL PRODUCTS

CROSS REFERENCE TO RELATED APPLICATIONS

The present application is a continuation-in-part of the application entitled "Method and Apparatus for Loading Stacks of Cartons of Frozen Animal Products onto Vessels Using a Carrier", filed Oct. 9, 2002, Ser. No. 10/268,182, now U.S. Pat. No. 6,622,854, which is a continuation-in-part of the application entitled "Method and Apparatus for Loading Stacks of Cartons of Frozen Animal Products onto Vessels Using a Carrier", filed Nov. 13, 2000, Ser. No. 09/712,741 now abandoned, which is a continuation-in-part of the application entitled "Method and Apparatus for Handling, Transporting, Pallet Removal, and Loading Cartons of Frozen Animal Products Onto Vessels", filed Apr. 30, 1999, Ser. No. 09/303,792, now abandoned, which is a continuation-in-part of the issued patent Ser. No. 09/093,461, filed Jun. 8, 1998 entitled "Method and Apparatus for Handling, Transporting and Loading Cartons of Frozen Animal Products Onto Vessels", issued Nov. 9, 1999, U.S. Pat. No. 5,980,198.

BACKGROUND INFORMATION

1. Field of the Invention

The present invention relates to the field of cargo handling, and in particular, to the rapid depalletizing and loading of cartons of frozen animal products onto a refrigerated vessel or cargo container.

2. Background of the Invention

While there have been significant advances in the methods employed for the loading and unloading of vessels and cargo containers, the loading of refrigerated, cartonized cargo, and in particular, frozen animal products has proved particularly difficult due to several intractable problems. As a result, the transfer of the products from the packers to their loading aboard a vessel or in a container is presently carried out by processes that involve high costs and significant expenditure of manual labor, and which include bottlenecks that slow the process, that may result in product degradation or spoilage, and that result in long loading times for the product onto the vessel or container. It is presently common for the handling of cartons of frozen animal products to proceed as follows.

A large volume of animal products such as frozen chicken, turkey, beef, pork and seafood products (including livers, hearts, other parts, deboned meat and the like) are frozen and shipped within and exported from the U.S. in relatively shallow, rectangular boxes. For example, chicken thighs, legs or quarters may be shipped in cartons of about 23.5 inches in length by 16.5 inches in width by 4 to 6.25 inches in height (59.7 cm by 41.9 cm by 10.2 to 15.9 cm). A preferred standardized box size for use with the present invention would be 24 inches by 16 inches (61.0 cm by 40.6 cm) with the height of the box varied to hold the particular products to be shipped. A box of such dimensions containing frozen chicken parts may weigh on the order of 30 to 45 pounds (14 to 20 kg).

As the cartons are generally filled fairly completely with unfrozen animal products, and the animal products are subsequently frozen while in the carton, the cartons of frozen animal products tend to be comparatively resistant to compressive forces. The cartons may also be slightly distorted from their rectangular shape owing to volume changes accompanying freezing and to their handling and stacking. For simplicity, reference will hereafter be made to cartons of frozen chicken, as other animal products may be handled in a similar manner.

Owing to the size restrictions imposed by standard trucks and trailers, the cartons are normally stacked on 40×48 inch (102×122 cm) pallets in layers of five cartons arranged with two cartons placed on the pallet in an end-to-end relationship beside three cartons placed side to side with their long axes perpendicular to those of the first two cartons. While the exact size of the stack of cartons may vary depending on the exact dimensions of the cartons, stacks of cartons and layers of such stacks will be referred to herein as having the foregoing dimensions or having a wider side of 48 inches (122 cm) and a narrower side of 40 inches (102 cm). These dimensions are, however, approximate, and may vary not only depending on the box dimensions, but also from such factors as bulging of the cartons of frozen chicken and irregularities in the stacking pattern. In general, however, the cartons have a relatively low aspect ratio (length divided by height). For example, a 4" tall by 16" long carton would have an aspect ratio of 0.25. This is significantly lower than, for example, the common apple boxes.

A palletload of cartons generally contains between about 10 to 12 such layers of cartons. A palletload of cartons arranged in this manner would have five cartons per layer. A 12 layer stack of cartons weighing 30 pounds (14 kg) would thus weigh about 1800 pounds (818 kg). Three such stacks of cartons would thus weigh about 5400 pounds (2454 kg, equal to 2.454 metric tons).

Although it is the general practice to use pallets having dimensions of 40×48 inches (102×122 cm) in the frozen animal products industry, which facilitate loading thereof into enclosed vans or trailers, 48×48 inch pallets (122×122 cm), which hold six rather than five cartons per layer, are sometimes used. In such case, the cartons are generally arranged in layers, each such layer having two rows of three cartons with the three cartons of each row in side-to-side arrangement.

The stacking pattern for either the 48×48 or 40×48 inch pallets (122×122 cm or 102×122 cm) may be varied, as by rotating it from layer to layer. For the 40×48 inches (102×122 cm) pallets, for example, the two end-to-end cartons may be arranged along one of the long edges of the pallet in one layer and along the other long edge in the next layer.

Presently, wooden pallets are typically made of three parallel beams arranged with a center beam and two outer beams on either side thereof. Boards or other such support members are nailed, stapled or otherwise fastened to the upper and lower surfaces of the beams transversely to the beams to form the upper and lower surfaces of the pallet. Lift channels extending parallel to the beams are thus formed between the upper and lower transversely-mounted boards. Apertures may be provided in the beams along their lower edges and/or boards may be removed from the lower pallet surface in the area of the apertures ("4-way apertures") to permit insertion of lift truck blades into the pallet transversely to the beams and lift channels (these are often called "4-way" pallets, as a lift truck can insert the lift blades into the pallet from any of four directions).

The packer sends the fresh chicken parts in such palletloads to a blast freezer/cold storage warehouse. At the warehouse, the cartons are restacked with spacers between the layers thereof. The spacers allow the circulation of air between the layers of cartons. Once the cartons are so stacked, the palletload of cartons are transferred to a blast freezer, which forces air chilled to about −40° F. (−40° C.) between and around the cartons. The chicken parts should be cooled in the blast freezer to 0° F. (−17.7° C.) and should be held at that temperature. When the freezing process is completed, the cartons are removed from the blast freezer and placed in a rotator. The load of cartons is then rotated 90 degrees onto its side, the spacers are removed, and the load of cartons is then rotated back to an upright position in which it rests once more on the pallet. In order to facilitate transportation and storage of the stacks of cartons, the stacks may be, and typically are, wrapped with a stretchable plastic film to help reduce sliding of the layers of cartons relative to one another. Lift trucks are then used to move the cartons of frozen chicken products and transport them into the cold storage warehouse.

When the time comes to load a ship, lift trucks are used to remove the palletloads of stacks of cartons of chicken parts from the warehouse, and place them inside dry van trucks or truck trailers for transportation to the dock. The trucks or truck trailers are typically uninsulated and unrefrigerated, and thus can provide a deleterious environment to the frozen product contained therein if they are not soon loaded into a refrigerated ship. At the dock, the cartons are removed from the truck trailer by lift trucks and placed on the dock. Alternatively, if the cold storage warehouse is sufficiently near to the dock, the lift trucks may transport the palletloads of stacks of cartons directly to the dock. In either case, the palletloads of stacks of cartons are subsequently lifted into the hold using the ship's gear, such as by using slings, lifting platforms, lift cages, flying forks or the like to lift the cartons and pallets.

Many of the ships transporting cartons of frozen chicken internationally are older vessels having ship's gear with a three-ton (metric) rated capacity. This permits them to lift up to three stacks of cartons at a time, depending on the weight of the stacks and of the gear used to lift them. However, other ships may have cranes with capacities of five or more tons. The mass of lift cages, of course, can be substantial, approaching one ton for a lift cage that can be used to lift two stacks of cartons. Thus, with three-ton ship's gear, it would generally only be possible to lift two stacks of cartons into the hold of the vessel at a time.

In the hold, lift trucks engage the pallets and transport the pallets with their stacks of cartons to locations near where the cartons will be stowed. Stevedores then manually remove the cartons from the pallets and stack the cartons without pallets for shipping. The pallets are then returned to the square of the hatch and are stacked to be hoisted out of the hold and back onto the dock by the ship's gear. The square of the hatch is the volume of space extending vertically downward from the open hatch to the floor of the cargo hold.

This process is quite inefficient. Delays in bringing a sufficient quantity of product to the dock and in unloading the cartons from the truck can increase the time needed to load the vessel. The space constraints in the vessel limit the number of workers who can be engaged in stowing of the cartons, and thus may create a backup for product arriving at the dock. Excessive delays in loading which result in the cartons being left on the dock or in the truck can allow the product to begin to thaw, which can result in spoilage or otherwise render the product unmarketable. Delay in loading may also result in increased condensation of moisture on the cartons which can complicate the handling process. As the industry is seeking to use less wax on the cartons and to utilize paper-coated boxes, the damaging effect of condensation and internal thawing on the boxes is increased.

The breakage rate for pallets during this process is fairly high. As many as half of the pallets suffer some breakage, and this can result in splintered wood, which may contain protruding nails, being left at the warehouse, on the dock and in the cargo hold of the vessel. Additional work is thus required to collect the pallets and pallet debris, to extract it from the hold of the ship or remove it from the dock, and to repair or discard the broken pallets. Further, the existence of pallet debris at the warehouse, on the dock, and in particular in the hold of the vessel, presents a risk of injury to workers.

Inefficient as this method of handling may be, there are a number of constraints that have made it difficult to improve. The main problem encountered is that the holds of the ship are irregular both in the overhead clearance and in the shape of the floor space. Not only does the overhead clearance of the cargo holds vary from ship to ship, and perhaps within a ship from hold to hold, the internal structure of the vessel and of the cooling system within it can result in overhead clearances that vary depending on the location within the hold.

Another difficulty in loading such cargoes is that the cartons are typically stacked to a uniform height after blast freezing. This is necessary for efficient use of the cold storage warehouse. This uniform height is generally ten or twelve layers of boxes arranged on a lift truck pallet, but it may vary somewhat from this number depending on the size of the cartons. The cartons are unitized by wrapping them with a stretchable plastic film that aids in transportation of the palletloads by lift truck, etc. However, space on refrigerated vessels is at such a premium that the wasted space of such pallets is considered undesirable. Thus, it has been considered necessary to avoid stowing the cartons on the pallets, and thus the practice of manually stowing the cartons in the ship by restacking them without the pallets has persisted. Moreover, since the ceiling height of holds on ships varies, and is seldom equal to the height of the cartons when stacked for warehousing purposes, it has heretofore been considered essential to manually stack the cartons in order to obtain as complete a filling of the vessel as possible.

Cargo containers do not have the problem of irregular shape, but their packing by means of hand stacking in order to eliminate the use of pallets has been an impediment to their efficient loading in terms of speed and workforce requirements.

Load push lift trucks have been used to push cargo off the lift truck blades. A load push lift truck has at least two blades extending from its lift mechanism. Load push, side shift lift trucks are known in the art of specialty lift trucks. Such lift trucks are discussed, for example, in U.S. Pat. No. 4,752,179 to Seaberg. Typically, the blades are relatively broad, and may have relatively smooth or polished upper surfaces to facilitate the sliding of the cartons thereon. A push plate associated with the lift mechanism can be extended by means of hydraulic cylinders from a retracted position adjacent the lift mechanism to a position adjacent the ends of the blades. If the stack of cartons is resting on the blades of the lift truck, the push mechanism may also be used to push the cartons off the blades and/or to extract the blades from under cargo as the lift truck moves backward away from the desired position of the stack of cartons. Such a lift truck may include a side-shift mechanism which permits small lateral adjustments in the position of the cargo to facilitate its precise placement. Such load-push lift trucks are known in the art of specialized lift trucks.

SUMMARY OF THE INVENTION

Parent U.S. Pat. No. 5,980,198 of common ownership and inventorship, which is incorporated herein by this reference, describes the lifting of palletless stacks of cartons into the hold of a ship using cargo slings. Lift trucks, and particularly load push or load push side shift lift trucks may be used for handling of stacks of cartons on pallets and for lifting palletless stacks of cartons.

One aspect of the invention provides a method for transportation of cartons of frozen products from alongside a refrigerated vessel into the hold of the vessel. In one aspect, palletloads of stacks of cartons may be positioned adjacent a carrier and pushed laterally from the pallet onto the carrier. Despite the weight of the stack of cartons, the stack may be pushed from the pallet in a direction generally parallel to the long axes of the boards forming the upper surface of a wooden pallet. A load push lift truck which is provided with sufficient clearance between the top of the blades and the bottom of the push plate so that the push plate may be extended over the upper surface of the pallet while the blades are inserted into 4-way apertures may be used for this purpose. The carrier may then be lifted into the hold of a ship. The carrier may be provided with fork channels, open channels of sufficient depth and spacing that can receive the blades (the forks) of the lift truck. This permits lifting of the palletless stack of cartons from the carrier for transport to a stowage location. The stack of cartons may be deposited at the storage location by sliding it relative to the long axis of the forks of the lift truck to deposit it in the stowage location. Depending on the configuration of the carrier, a lift truck with multiple sets of blades may be used to load two or more stacks of cartons onto the carrier at a time by use of the load push mechanism.

In another aspect of the invention, if the carrier is provided with fork channels, a lift truck may pick up the stack of cartons directly once the carrier is landed in the cargo hold of the ship. The load push lift truck may position the push mechanism in its fully retracted position and slides its blades into the fork channels under the stack of cartons. Thereafter, the entire stack of cartons may be transported to its stowage location or to a position near its stowage location, including stowage locations on top of another stack of cartons.

In another aspect of the invention, a roller deck may be used. The roller deck may be positioned alongside a vessel, and may include a plurality of parallel rollers or sets of wheels mounted along its length. At one end, the loading end, stacks of cartons may be pushed from pallets onto the rollers. At the other end, the slinging end, gaps in the rollers allow cargo slings to be extended across the roller deck for lifting the stacks of cartons into the hold of a vessel and/or lifting of stacks of cartons on the blades of lift trucks. The stacks of cartons may be manually or automatically pushed from the loading end to the slinging end of the roller bed, or the roller bed may be inclined such that the stacks of cartons roll down from the loading end to the slinging end of the roller bed. A spreader bar with multiple hooks along its length that are capable of receiving the ends of the slings may be attached to the ship's gear or other crane and used to pick up multiple stacks of cartons at a time from the slinging end of the roller deck. In such case, the stacks of cartons are landed on a landing pad in the hold of the vessel. The landing pad may include fork channels to allow lift trucks to pick the stacks of cartons up, and to allow the slings to be withdrawn from around the stacks of cartons. Stacks of cartons positioned side by side may be lifted by a single set of slings with each sling in the set extending under both stacks of cartons.

When the loading of the hold is completed except for the area under the square of the hatch, in another embodiment of the invention, the load push lift truck and other equipment and materials may be removed from the hold. Thereafter, the square of the hatch may be filled by using the ship's gear to lift one or more stacks of cartons from alongside into the square of the hatch using cargo slings disposed about the stack. Multiple stacks of cartons may be lifted at one time if a spreader bar or like apparatus is used.

Similarly, another aspect of the invention provides for use of one or more load push lift trucks with a roller deck to lift palletless stacks of cartons from the unloading position on the roller deck from either the end or side orientation by inserting the blades of the lift truck into channels running wholly or partially across the unloading position of the roller deck. Such a roller deck may act as a landing pad in the hold of a ship, or may serve as a queuing depalletizer used in conjunction with the loading of containers.

In another aspect of the invention, the slings may be positioned about the stack of cartons by positioning the carrier or other apparatus having channels extending thereacross beside the ship, depositing stacks of cartons without pallets on such carrier or apparatus, extending two or more slings around each such stack of cartons and lifting the stacks of cartons from the carrier by the slings by passing the eyes on either end of the sling over the hook or other such lifting device attached to the end of the cable of the ship's gear. When positioned in the square of the hatch, one side of each sling may be removed, preferably the side abutting any other stacks of cartons adjacent to such landed stack, and the slings can be pulled under the stack of cartons and between the stack and any adjacent stack by the ship's gear. The slings may thus be returned by the ship's gear to a position alongside the ship for reuse. Of course, in order to speed the loading of the square of the hatch, the slings may be left in place. Some manual restacking of cartons to fill the square of the hatch may be necessary in order to avoid the wasting of space in the cargo hold.

In yet another aspect of the invention, load push lift trucks and depalletizers may be used to load refrigerated cargo containers.

BRIEF DESCRIPTION OF THE DRAWINGS

FIG. 9 is a perspective view of cartons of frozen animal products being landed in the square of the hatch of a ship.

FIG. 28 is a perspective view of the lifting portion of load push lift truck with a pallet restraint mounted to the blades.

FIG. 29 is a perspective view of a lift truck with a clamp-type pallet restraint.

FIG. 30 is a top plan view of the clamp-type pallet restraint of FIG. 29 with parts broken away.

DETAILED DESCRIPTION OF EMBODIMENTS OF THE INVENTION

Figure 1:
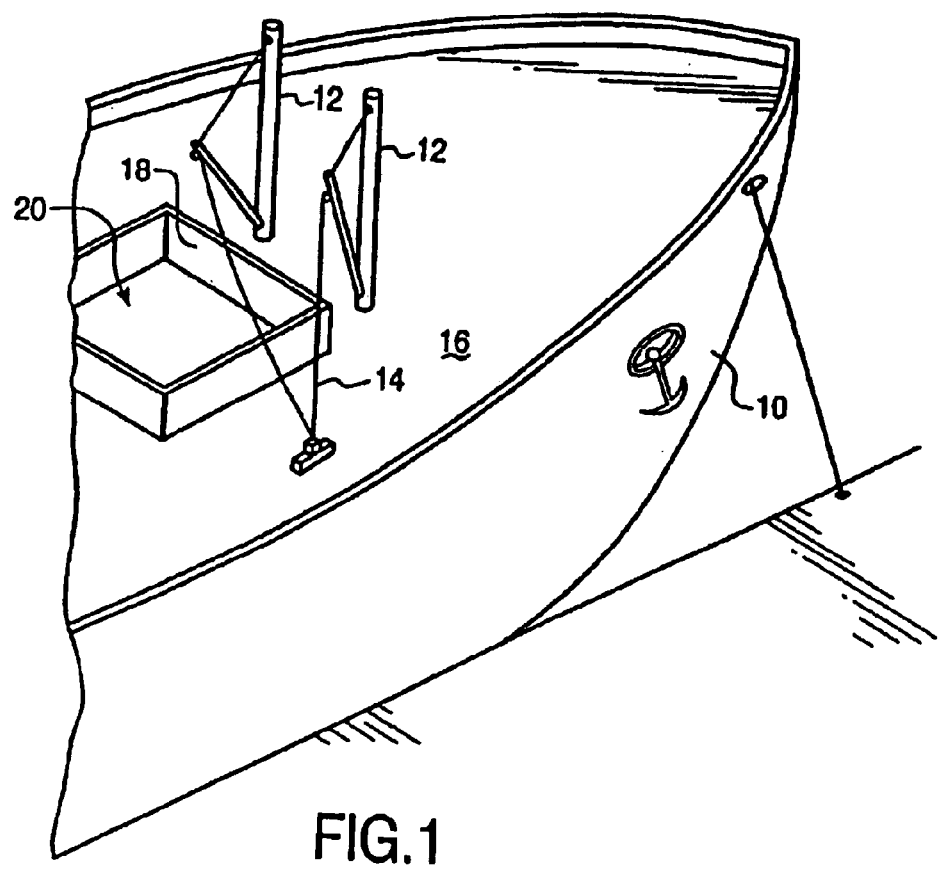
FIG. 1 is a partial perspective view of a ship adapted to be loaded with stacks of cartons of frozen animal products.

FIG. 1 depicts a ship 10 tied up alongside a dock. The ship is provided with ship's gear 12 for loading and unloading the ship 10. The ship's gear 12 is provided with a cable 14 that may be extended and retracted using a winch system (not shown). The deck 16 of the ship 10 is provided with one or more hatches 18. The ship's gear 12 is used to lift cargo from alongside the ship 10 into the hold 20 of the ship 10. Typically, a ship 10 has a plurality of such holds 20, each of which is accessible by means of a hatch 18. Ships used to transport frozen products are typically provided with refrigeration apparatus for maintaining the holds 20 at a low temperature.

Figure 2:
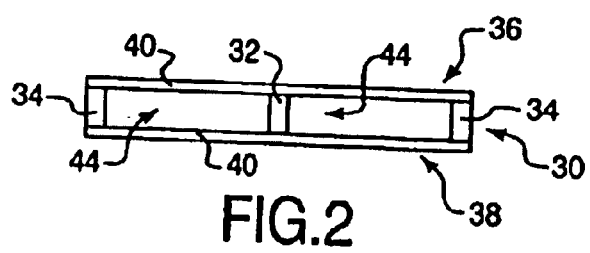
FIG. 2 is a front elevation of a typical 4-way wooden pallet.
Figure 3:
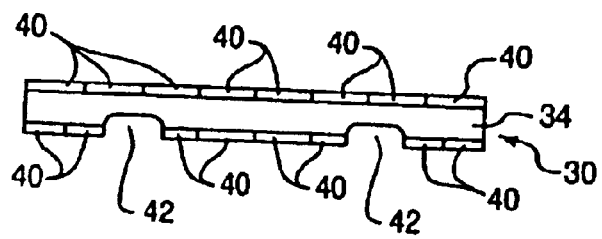
FIG. 3 is a side elevation of a typical 4-way wooden pallet.

FIGS. 2 and 3 are side elevation views of a standard 4-way pallet 30, on which a variety of cargo may be stacked. Such pallets are commonly used for holding and transporting stacks of cartons, including stacks of cartons of frozen animal products, such as frozen chicken parts, frozen organ meat, such as liver and kidney, or other frozen animal products. As is known in the art, the 4-way pallet 30 comprises a center beam 32, which runs the length of the pallet 30, and two side beams 34 which likewise run the length of the pallet 30 and which are disposed along opposite edges of the pallet 30.

The upper and lower surfaces 36, 38 of the pallet 30 are formed by a plurality of boards 40 which extend across the width of the pallet and which are fastened to the beams 32, 34 by nails, screws or other fasteners. Cutouts 42 are provided along of the lower edges of the beams 32, 34. The boards 40 which make up the lower surface 38 of the pallet 30 do not cover the area of the cutouts 42. As is well known in the art of cargo handling, a lift truck may lift the pallet 30 either by inserting its blades in the closed-top fork channels 44 (best shown in FIG. 2) and then using the lifting gear to raise the forks and the pallet 30. The pallet may also be lifted by inserting the blades (forks or platens) of a lift truck through the channels ("4-way channels") formed by the cutouts 42 in the beams 32, 34 and then raising the blades.

A lift truck usable according to the present invention may include two relatively flat blades which may conveniently have a width of 4 to 8 inches (10.2 to 20.3 cm), and may include side shift capability. The blades may be smooth and polished, and may have rounded or tapered edges. The load push system should be sufficiently powerful to push a full stack of cartons of frozen chicken parts or the like off of the blades and into a stowage location, such as a position atop another stack of cartons.

Figure 4:
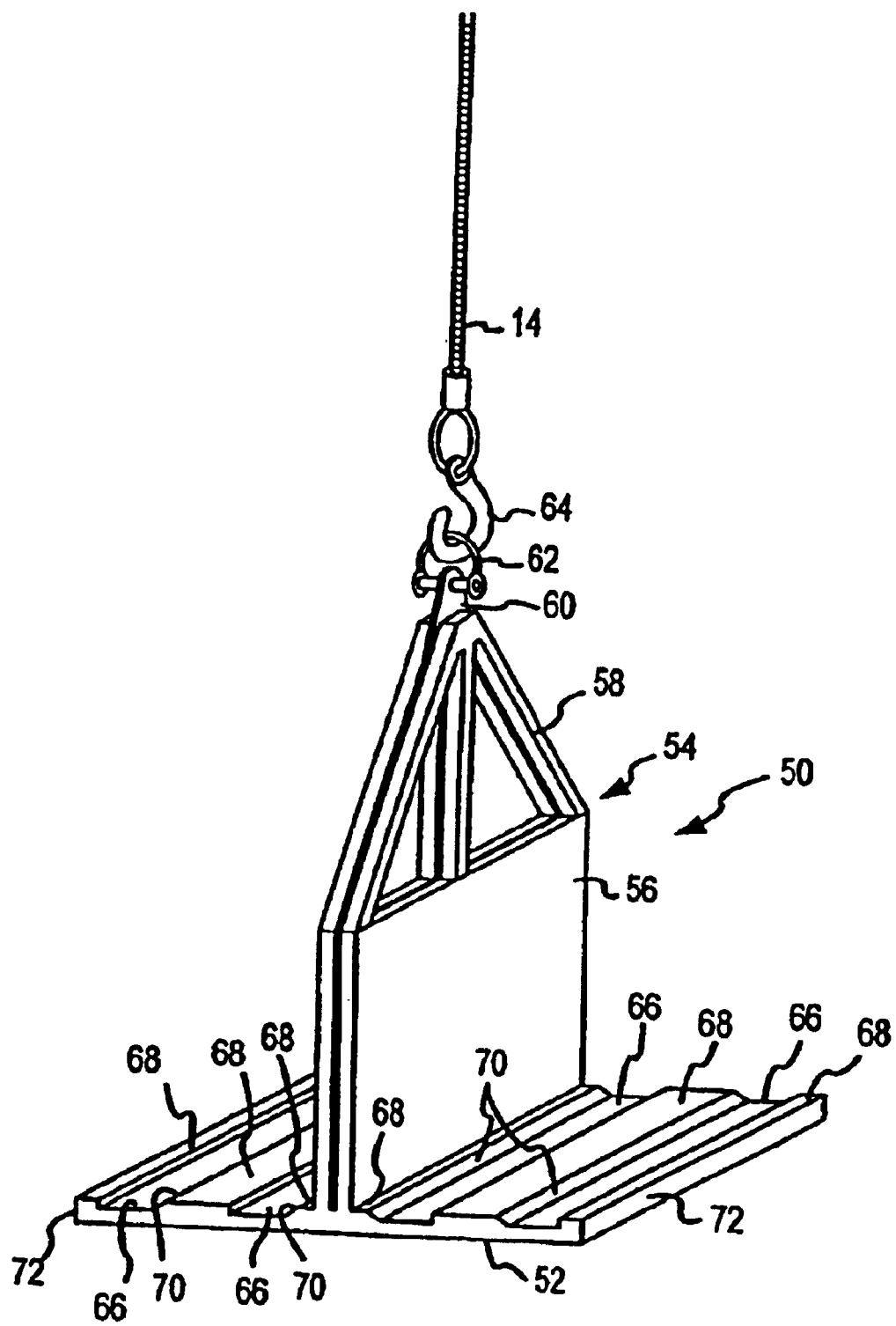
FIG. 4 is a perspective view of a carrier according to one embodiment of the invention.

FIG. 4 is a perspective view of a carrier 50 according to one embodiment of the present invention. The carrier 50, which may be made of rectangular steel tubing, steel I-beams and/or steel plate, is preferably welded together, but may be made of other materials, such as aluminum, and may be assembled using bolts or other fasteners, or by other means known in the art. The carrier 50 is comprised of a base 52 and an upright center stop 54. As shown in FIG. 4, the center stop 54 of the present embodiment includes a lower, generally rectangular section 56 and a generally triangular lifting section 58. A clevis 62 it is mounted through an aperture in a plate 60 at the apex of the lifting section 58. The clevis 62 is adapted to receive a hook 64 attached to the free end of the cable 14 of a ship's gear 12 or other such lifting device.

The rectangular section 56 of the center stop 54 may be of any desired dimensions, but in the present embodiment, is relatively thin and is approximately as tall and wide as a stack of cartons of frozen chicken parts or the like. The center stop 54 of the present embodiment may have as great a height as may be conveniently use for the purposes hereof. As will be appreciated by those skilled in the art, an increased height of the center stop 54 will reduce the degree of tipping of the carrier 30 under asymmetric loads, for example, when only a single stack of cartons mounted on one side only of the carrier is being lifted. Of course, if the center stop 54 is too tall, such height may make the carrier 50 difficult to transport and store, and may increase the overall weight of the carrier 50.

The base 52 of the carrier 50 is generally planar in structure. The base 52 of the carrier 50 of the present embodiment may be made of steel plate, of steel plate welded to a frame made of rectangular steel tubing or I-beams, or the like, so long as it is sufficiently rigid to bear the weight of stacks of cartons of frozen chicken without undue flexure, and is sufficiently light that the combined weight of the carrier and the cargo is within the load limits of the ship's gear 12. The center stop 54 is mounted transversely to the long axis of the base 52 across the middle section thereof, and such mounting should be sufficiently rigid to accommodate asymmetrical loads such as those mentioned above.

A plurality of fork channels 66 are formed in the surface of the base 52 for receiving the blades of a lift truck. If lift trucks having two forks are used, then the carrier 50 should be provided with two fork channels 66 on each side of the center stop 54. If fork lifts with more than two forks are used, then a corresponding number of fork channels 66 should be provided on each side. It should be noted that a three-blade lift truck can lift a stack of cartons arranged in the 2-3 pattern typical for a standard pallet can have its blades spaced apart to lift the stack of cartons from either the 48 inch side or the 40 inch side, although lifting the stack of cartons with two blades from either orientation is more problematic unless the blades are very broad and/or precisely positioned under the load.

The depth of the channels 66 should be sufficient to allow insertion of the lift truck blades therein beneath a stack of cartons of frozen chicken placed on top of the base 52 when the stack of cartons of frozen chicken are supported by the upper surface portions 68 of the base 52.

The walls 70 of the sling channels 66 which face away from the base 52 are angled upwardly and inwardly toward the center stop to facilitate the sliding of stacks of cartons of frozen chicken onto the base 52 of the carrier 50 and into contact with the center stop 54. The outer edges of the base 52 function as pallet stops 72, as will be explained in greater detail below.

While the carrier 50 is shown as having two areas for placement of stacks of cartons of frozen chicken, configurations having a greater or lesser number, such as one or three or four such areas, may be designed, as will be appreciated by those skilled in the art.

In one embodiment of a method according to the present invention, a carrier 50 is used to lift depalletized stacks of cartons of frozen animal products. The embodiments of the invention will be described with reference to cartons of frozen chicken parts or frozen chicken for convenience, even though they are applicable to other frozen animal products stored in similar cartons.

Figure 5:
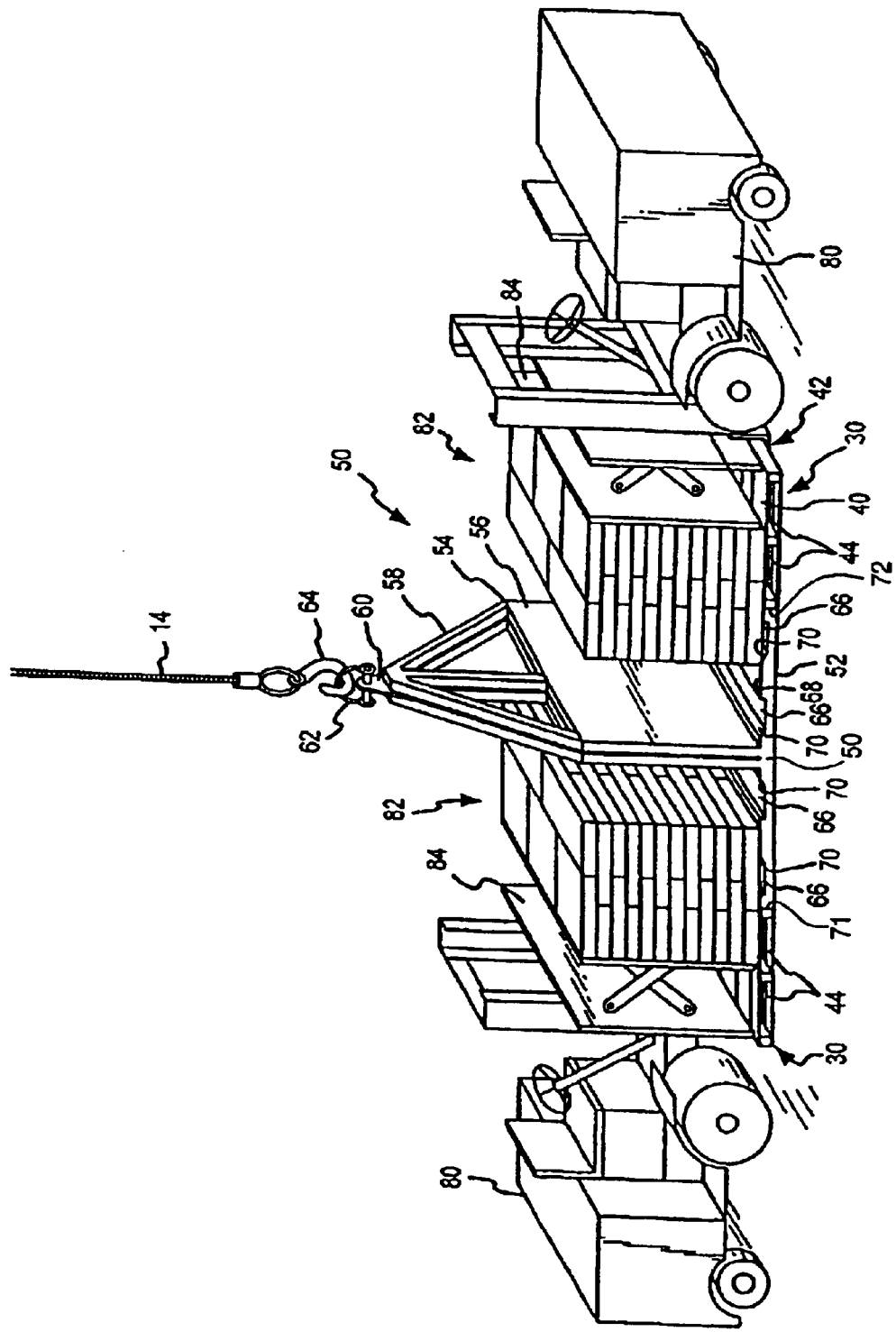
FIG. 5 is a perspective view of the carrier of FIG. 4 being loaded with stacks of cartons of frozen animal products by load push lift trucks.

Referring next to FIG. 5, a load push lift truck 80 (or side shift, load push lift truck) is used to lift a 4-way pallet 30 bearing a stack of cartons of frozen chicken 82 by inserting the blades of the lift truck into the cutouts 42 of the 4-way pallet 30. The pallet 30 and stack of cartons 82 may then be lifted by raising the blades of the lift truck. In the method of the present embodiment, the lift truck carries the pallet 30 to a position in which the side of the pallet 30 opposite the lift truck 80 abuts or is in close proximity to the pallet stop 72 of the base 52 of the carrier 50. The pallet 30 and stack 82 may then be lowered to the ground and the stack of cartons of frozen chicken 82 may then be pushed from the pallet 30 in a direction generally parallel to the long axis of the boards 40 of the pallet 30.

The direction of sliding of the stack of cartons from such a pallet 30 may be chosen to reduce abrasion of the lower surfaces of the cartons in the bottom layer of the stack of cartons to acceptable levels consistent with the maintenance of quality standards for the frozen products contained in the cartons. Tearing through of the cartons to expose the frozen animal products is generally considered undesirable. Of course, if the upper surface of the pallet 30 is sufficiently smooth, or any edges are sufficiently beveled, the direction of sliding of the stack of cartons relative to the pallet 30 may not cause sufficient abrasion to the lower surfaces of the cartons to be of concern. With standard pallets 30, pushing the stack of cartons of frozen animal products 82 may be successfully accomplished without the use of slip sheets or the like.

Slip sheets present special challenges in the handling of cartons of frozen animal products. First, the cost of the slip sheets is such that it is not generally economical to stow the stacks of cartons with the slip sheets. Further, if the slip sheets are carried into the hold of a ship with the intent that they will not be stowed with the cartons, they must be collected and removed from the ship. Finally, if the cartons are carried into the ship with slip sheets on slings or by carriers, and if they are thereafter lifted by lift trucks and stowed with the cartons, they can block vertical airflow in the hold. As many refrigerated vessels depend on vertical airflow for cooling, this may result in improper cooling of the frozen animal products during shipment, with attendant spoilage.

In the present embodiment, the bottom of the push plate of the load push lift truck 80 is provided with sufficient clearance over the forks that the push plate can engage the stack of cartons 82 without engaging the pallet. Four inches (10 cm) of clearance of the push plate over the blades of the lift truck should be sufficient with most standard pallets, but if taller pallets are used, additional clearance may be required.

According to the present embodiment, stacks of cartons 82 of frozen chicken 30 may be pushed off of pallets in this direction without undue damage to the bottom of the bottom layer of the stack of cartons 82. The inclined face of the walls 70 further aid in avoiding damage to the cartons. Should the leading edge of any of the cartons of the stack of cartons 82 droop in the fork channels 66 to a level below the upper surface 68 of the base 52 of the carrier, the slope of the walls 70 of the fork channels 66 will urge the drooping corners back upward to the level of the upper surface 68 of the base 52. The stack of cartons may be pushed into engagement or close proximity to the center stop 54 of the carrier 50.

While the simultaneous loading of two stacks of cartons of frozen chicken 82 onto the carrier 50 by different lift trucks from opposite directions will reduce the risk of the carrier 50 being pushed along the dock, it should generally be possible for one lift truck 80 to load the carrier 50 without sliding it along the dock.

Of course, once the stack of cartons 82 is properly positioned relative to the carrier, it could be caused to slide onto the carrier 50 by a separate pushing or pulling mechanism that does not require the presence of the lift truck. It should be noted that the pushing mechanism should be configured to push the cartons from the pallet without pushing the pallet at the same time.

Figure 6:
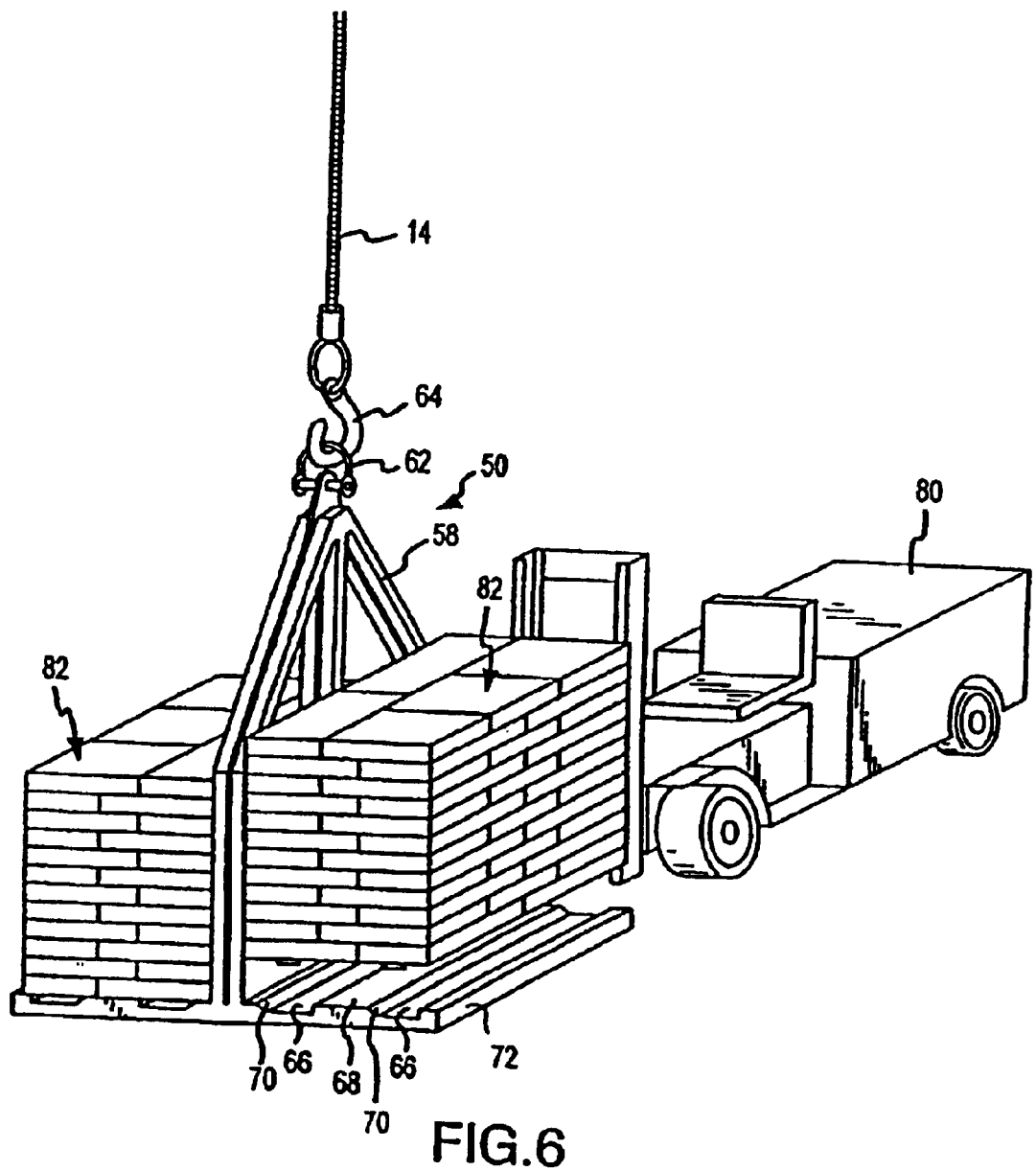
FIG. 6 is a perspective view of the carrier of FIG. 4 with a stack of cartons of frozen animal products being removed therefrom by a load push lift truck.
Figure 26:
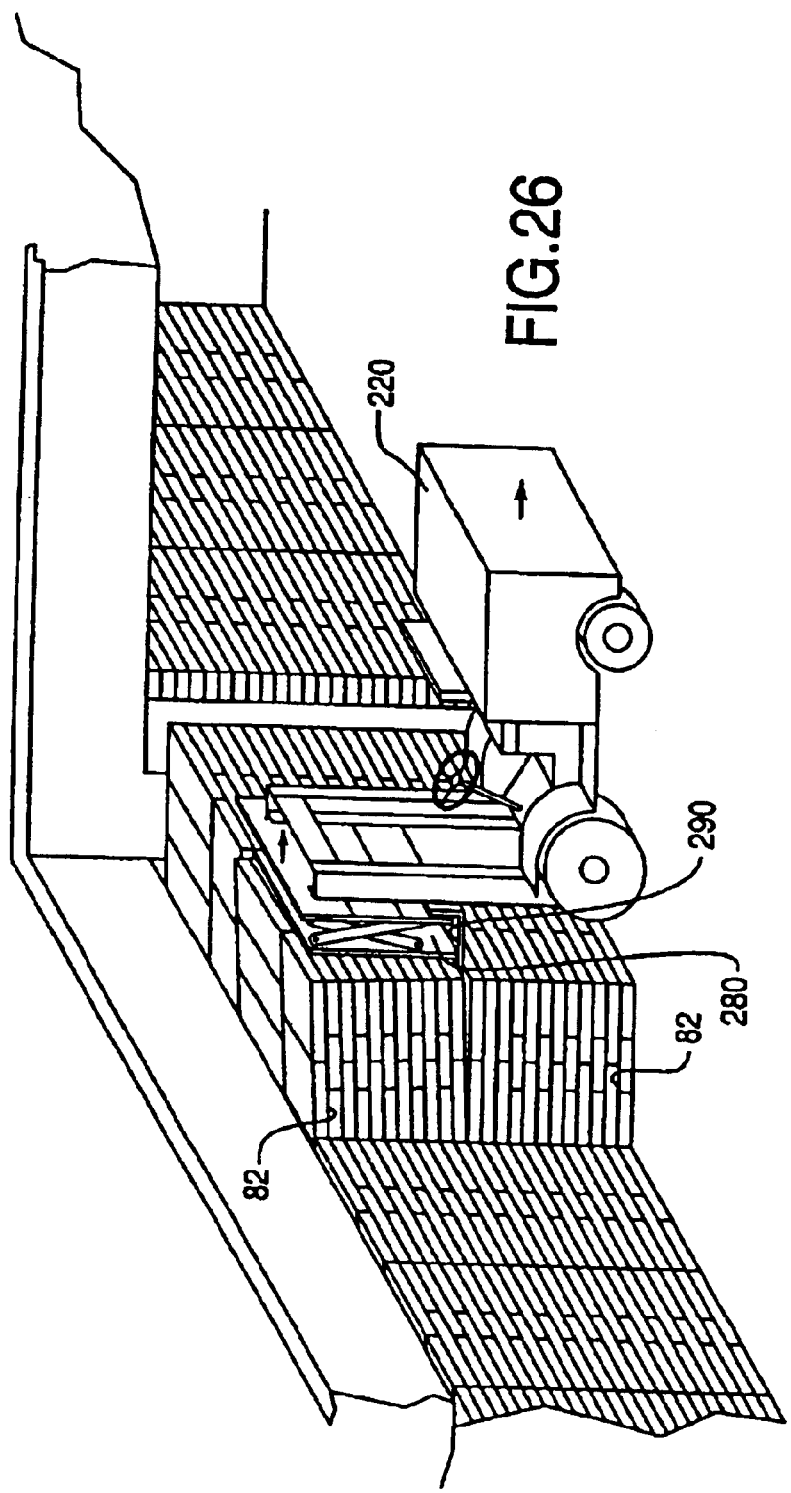
FIG. 26 is a perspective view of a stack of cartons being deposited in a stowage location in the hold of a ship by a load push lift truck.

Still referring to the method of this embodiment, once the carrier 50 is loaded, the ship's gear 12 can lift it into the hold of the ship 10. When the carrier 50 has been landed in the hold, as shown in FIG. 6, a load push lift truck 80 is then used to lift the stack of cartons off the carrier 50 and to transport the cartons to the storage location. At this stage, either of two approaches may be taken. The load push lift truck 80 may initially deposit the stack of cartons 82 in their final stowage location, with a view to stevedores subsequently filling the remaining space atop the stack from a lift-truck-deposited stack of cartons 82 nearby, or the lift truck may deposit the stack in a convenient location with a view to the stevedores breaking down the stack into two or more shorter stacks on top of which the load push lift truck 80 may deposit a full stack of cartons 82, the combined height of the hand-stacked and lift-truck-deposited cartons filling the available vertical space (see FIG. 26).

Of course, if the height of the hold space will accommodate two stacks of cartons 82, then the lift truck 80 may deposit both such stacks of cartons 82 in their final stowage location. Providing the load push lift truck 80 with side shift capability allows for greater precision in the placement of the stacks of cartons 82. Such side shift mechanisms shift the carrier and forks of a lift truck 80 laterally, usually by means of a hydraulic cylinder.

Two lift trucks 80 may be used to remove the stacks of cartons 82 from the carrier 50, so that the carrier may be quickly returned to the dock for further loading. The cycle time of the ship's gear 12 or crane lifting the carrier can be significantly increased if the loading or unloading of the carrier 50 is delayed. If the carrier 50 is designed to carry more than two stacks of cartons 82, of course, more lift trucks may be used simultaneously to unload it, thereby minimizing the time the carrier 50 remains in the hold. Similarly, the time the carrier remains on the dock can be reduced by using multiple lift trucks 80 in the loading of the carrier 50.

In order to deposit a stack of cartons 82 on the floor of the cargo hold, the lift truck operator moves the stack 82 into the desired position and lowers the blades of the lift truck to the floor. If necessary, the side shift function can be used to position the stack in abutting relation with an adjacent stack or wall. The lift truck operator then simultaneously actuates the load push mechanism and either backs the lift truck away from the location or allows the load push mechanism to push the lift truck back from the stack (assuming the front of the stack is engaged with another stack or with a wall). The process for depositing a stack of cartons 82 on top of another partial or full stack is the same, except the lift truck positions the blades immediately above the full or partial stack on top of which the full stack is to be deposited.

For stowage in irregular spaces, such as adjacent a sloping wall, in spaces too small for a full stack to be inserted or the like, the lift truck may deposit a full stack of cartons near such stowage location and the stevedores can stow the cartons in such areas by hand.

With reference to FIG. 9, when substantially all of the cargo hold has been filled, apart from the square of the hatch, the lift truck(s) and carrier 50 are removed from the hold, and the square of the hatch is filled by depositing stacks of cartons lifted by cargo slings directly into the square of the hatch using the ship's gear 12. Some manual stowage of cartons will likely be necessary, of course, as the ceiling height under the closed hatch may not be fillable merely by loading full stacks of cartons one on top of another.

Figure 7:
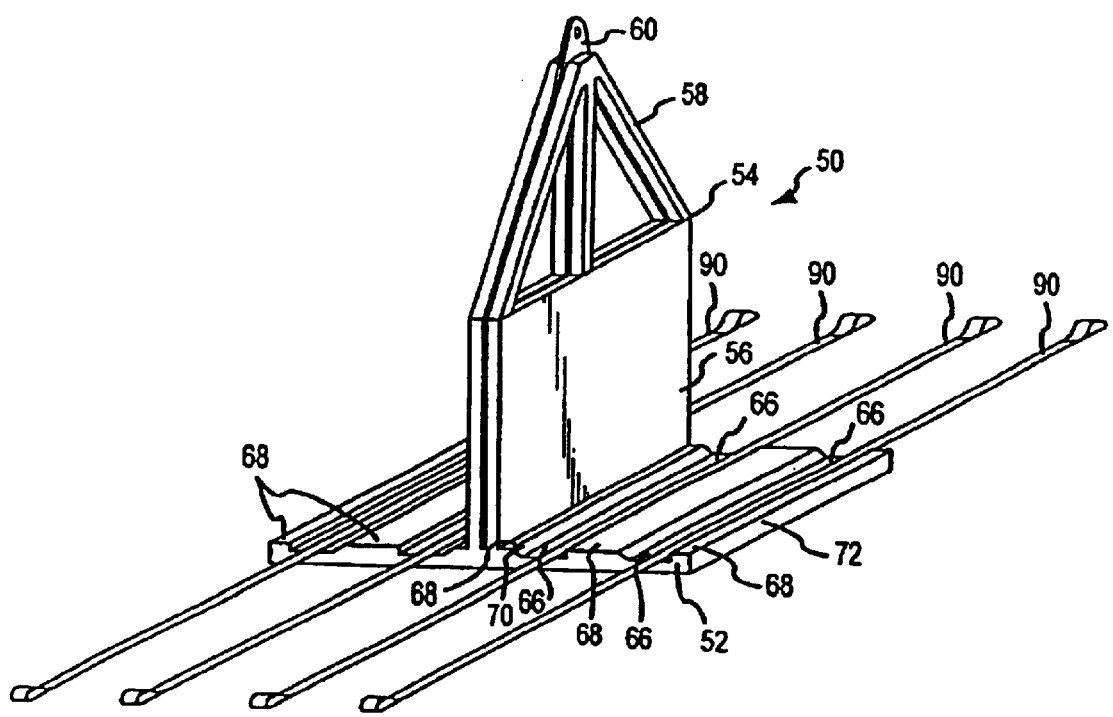
FIG. 7 is a perspective view of the carrier of FIG. 4 with cargo slings positioned in the fork channels thereof.

In another embodiment of the invention, the carrier 50 may be used on the dock to depalletize and provide slings about the stacks of cartons 82 to be deposited directly into the square of the hatch without the use of slip sheets. As shown in FIG. 7, slings 90 may be prepositioned in the fork channels 66 prior to pushing the stack of cartons 82 onto the carrier 50, or may be drawn through the fork channels 66 after loading of the carrier by means of a rod with a hooked end or the like. The fork channels 66 of the carrier 50 provide a convenient means for positioning the slings and provide the ability to add the slings either before or after loading of the carrier. The carrier 50 may also be used as a depalletizer in a refrigerated warehouse or in other locations, as a load push lift truck 80 may extend its forks through the fork channels 66 and lift the stack of cartons 82 from the carrier 50.

Figure 8:
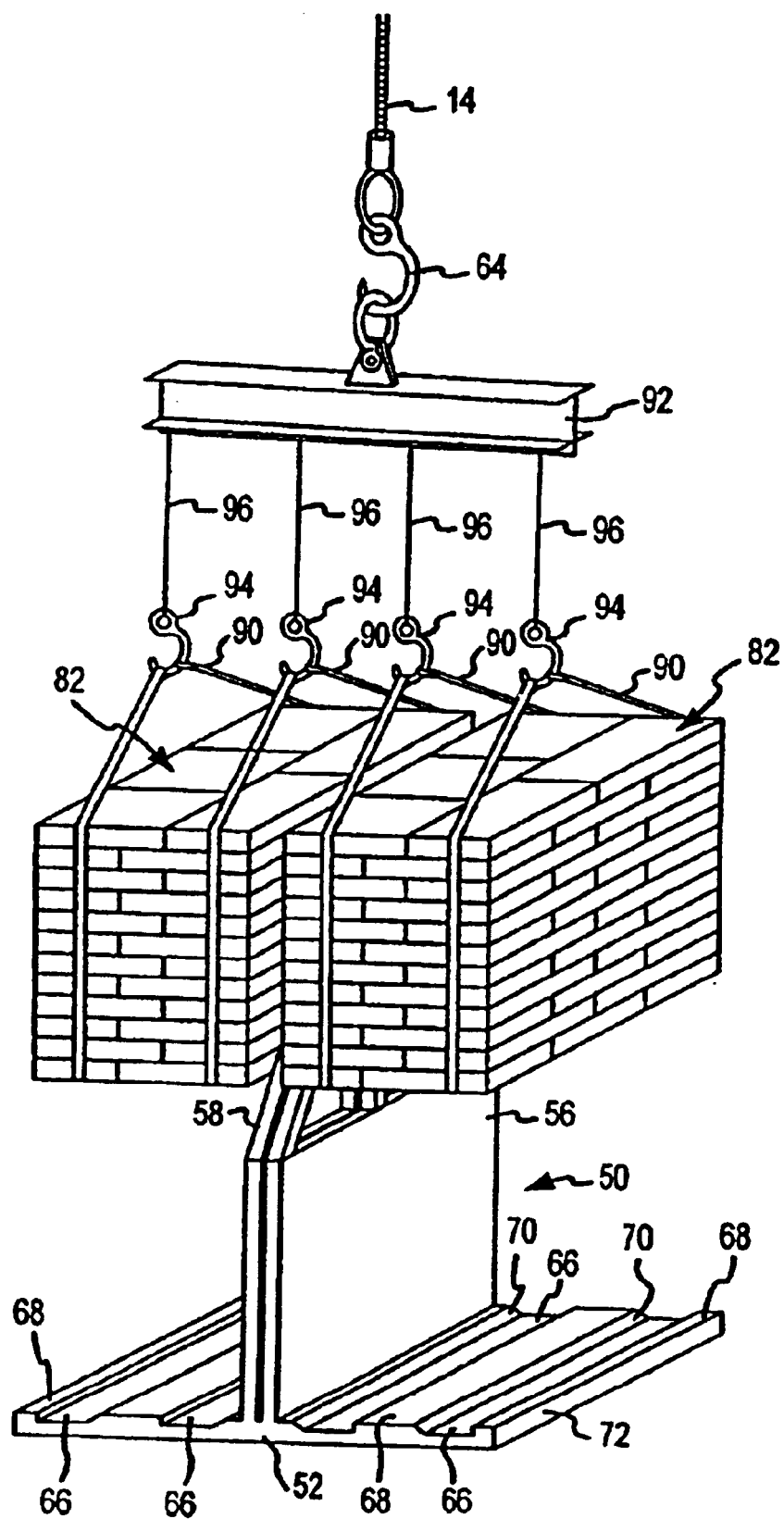
FIG. 8 is a perspective view of cartons being lifted from the carrier of FIG. 4 using cargo slings.

As shown in FIG. 8, once the carrier 50 is loaded with stacks of cartons 82, as previously described, and once the slings 90 are positioned with respect to the stacks of cartons 82, a spreader bar 92 mounted on the hook 64 at the end of the cable 14 of the ship's gear 12 may be used to lift the stacks of cartons 82 into the ship's hold. A plurality of hooks 94 are attached to the spreader bar 92 by lengths of cable 96 for engaging the eyes of the cargo slings 90 for lifting of the stacks of cartons 82. If the slings 90 are properly positioned relative to the stack of cartons 82, the stacks of cartons 82 will swing toward one another into abutting relation after they have been lifted free of the carrier 50 by the ship's gear 12. The stacks of cartons 82 may then be deposited in the square of the hatch directly into their stowage location by the ship's gear, as shown in FIG. 9. While it may appear that the cartons of the stack 82 would fall from the bottom of the stack when lifted by slings or the blades of a lift truck, it has been found that they do not tend to do so even when the stack of cartons 82 is not wrapped with the stretch wrap material.

Of course, the slings used to load the stacks of cartons into the square of the hatch may be left in the cargo hold, and this will facilitate the offloading of the vessel. In such case, the cost of the cargo slings is offset by the lower labor and other costs achieved by the practice of filling the square of the hatch in this manner.

In another embodiment of the invention, however, as shown in FIG. 9, it has been found that the slings 90 may be recovered by lowering the spreader bar 92 sufficiently to remove tension from the slings 90, unhooking one end of the slings 90 from the hooks 94 and then drawing the slings 90 from about the stacks of cartons 92 by lifting the spreader bar 92 using the ship's gear 12. In order to avoid urging the stacks of cartons 82 so deposited out of an abutting relationship with adjacent stacks, the ends 98 of the slings which are released may be those which run between the deposited stacks of cartons and the adjacent stacks, as shown in FIG. 9.

Figure 10:
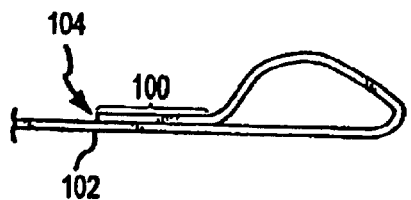
FIG. 10 is a side elevation of an end portion of a cargo sling.

As shown in FIG. 10, the eyes in cargo slings 90 are frequently made by folding the end portion 100 of the web material of which the sling is made back over a portion of the web material 102 in a loop and sewing or otherwise bonding the end portion 100 to the portion 102. In one embodiment, cargo slings for use in loading the square of the hatch are made of a thinner material to avoid providing an excessively thick overlapping portion, and the edge 104 of the end portion 104 is securely fastened to the portion 102 of the sling 90 to reduce the tendency of the edge 104 to catch and peel away from the portion 102 when the sling 90 is drawn between two abutting stacks of cartons. The end of the sling 90 may also be cut at a diagonal before looping it back and affixing it to the portion 102.

Figure 27:
FIG. 27 is a perspective view of a landing pad.

Of course, the carrier 50 or a modification thereof (e.g., one in which the triangular top portion 58 of the center stop 54 was removed, or in which the entire center stop 54 itself was absent) could be used to depalletize and provide slings around stacks of cartons 82. These slung stacks of cartons could then be lifted into a ship 10, landed on a landing pad, and stowed by a side shift load push lift truck in the manner described in U.S. Pat. No. 5,980,198 to Coblentz. That is, a landing pad such as that shown in FIGS. 14, 15, 27 (or multiples of such a landing pad, as needed, in the event that multiple stacks of cartons 82 are lifted at one time, e.g., as shown in FIG. 8) could be provided in the hold, the slung stacks of cartons could be deposited on the landing pad, the slings could be removed from the stack of cartons by pulling them through the channels in the landing pad, and a load push lift truck could remove the stacks of cartons from the landing pad by inserting its blades into the fork channels of the landing pad and raising the blades. The stack of cartons could then be stowed using the lift truck as hereinbefore described. As with the landing of stacks of cartons in the square of the hatch, one end of each of the slings 90 may be removed from the hooks 94, and the ship's gear 12 may then pull the slings through the channels formed in the landing pad and return them to dockside for reuse.

Figure 11A:
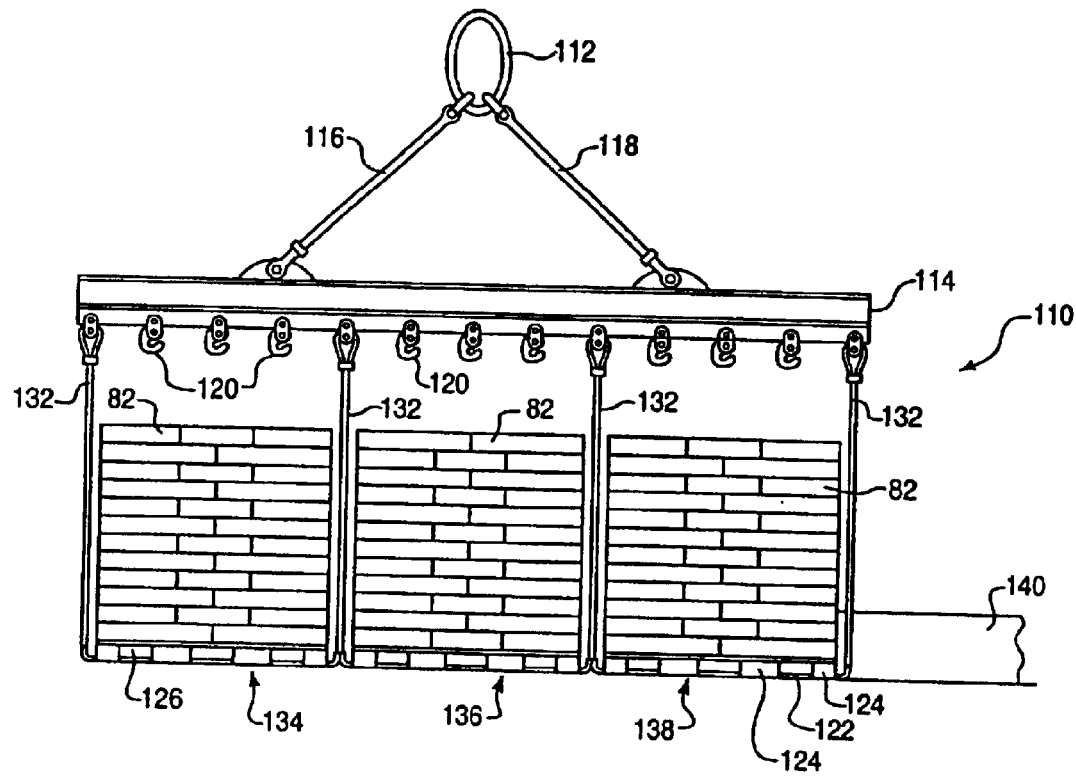
FIG. 11A is a front elevation of a light-weight carrier according to another embodiment of the invention bearing three stacks of cartons.
Figure 11B:
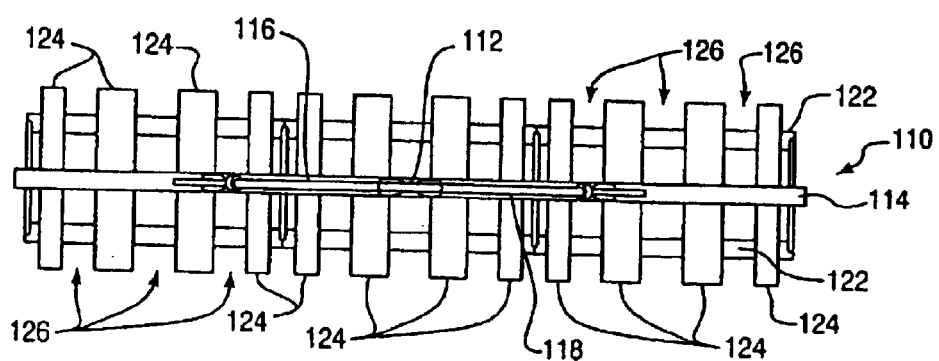
FIG. 11B is a top plan view of the carrier of FIG. 11A without stacks of cartons loaded thereon.

FIG. 11 depicts a lightweight carrier 110 that may be connected to a ship's gear by the lift ring 112. The carrier 110 comprises a spreader bar 114 connected to the lift ring 112 by two cables 116, 118. A plurality of hooks 120 are mounted into the spreader bar 114.

Figure 12:
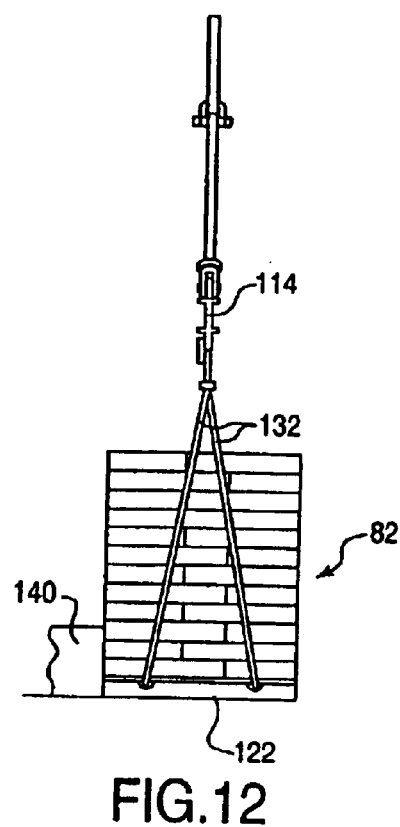
FIG. 12 is a side elevation of the carrier of FIG. 11.

Referring to FIGS. 11 and 12, the carrier 110 further comprises a base 122 on which are mounted a plurality of supports 124, which are of sufficient height to form channels 126 extending across the base 122 under the stacks of cartons 82. The supports 124 are of sufficient width and depth to permit the blades of a lift truck to be inserted into the channels 126 formed between them.

As can be seen from FIGS. 11 and 12, the stacks of cartons are arranged in a three-two carton stacking pattern commonly used for stacking cartons of frozen chicken on a standard 40 by 48 inch (102×122 cm) pallet 30 with the 48 inch face of the stacks of cartons 82 being shown in FIG. 11 and the 40 inch face being shown in FIG. 12.

Figure 13:
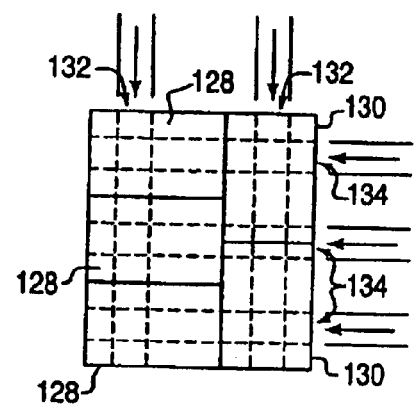
FIG. 13 is a top plan view of a layer of cartons arranged in a 3-2 pattern, with lifting zones shown in phantom.

As shown in FIG. 13, the three-two pattern comprises three cartons 128 arranged side-by-side with their long edges abutting one another. Two cartons 130 are arranged in end-to-end relation beside the row of the three cartons 128.

Cartons 128, 130 arranged in this manner (e.g., as the bottom layer of a stack of cartons 82) may be lifted from the 40 inch (102 cm) sides of the pattern by inserting two slings or two lift truck blades under them, for example, in the two lifting zones 132 shown in phantom in FIG. 13. Three slings or three lift truck blades could be inserted under the cartons of 128, 130 from the 48 inch (122 cm) side of the three-two pattern of cartons 128, 130 by supporting them, for example, in the in the lifting zones 133 of which extended transversely to be lifting zones 131 and are likewise shown in phantom. When lifting a stack of cartons with the bottom layer stacked in this manner using slings or lift truck forks extending from one of the wider (48 inch–122 cm) sides of the pattern, for security in lifting, three slings or fork platens should be used so that each of the three side-to-side cartons 128 is supported by one of the slings or platens.

Referring again to FIGS. 11 and 12, the base 122 is connected to the spreader bar 114 by cables 132 which extend from connection points along the spreader bar 114 to either side of the base 122 (best shown in FIG. 12). The carrier thus provides three load areas 134, 136, 138, each of which is bounded on either side by two of the four pairs of cables 132. The need for stiffness of the base 122 is thus reduced, as the weight of the three stacks of cartons 82 is supported at four locations along the length of each side of the base 122 rather than only in the middle of or at the opposite ends of the base 122. This permits the weight of the base 134 to be sufficiently low to allow for the lifting of the three stacks of cartons 82 into the hold of a ship with a three-ton ship's gear 12 or crane. Of course, the inner two of the four pair of cables 132 could be eliminated if a base of sufficient stiffness is provided. Of course, depending on the capacity of the loading crane, a base 122 could be fashioned to allow for the loading of two, four or other numbers of stacks of cartons. Further, the depth of the base 122 could be extended to allow loading of two stacks of cartons, one behind the other, to provide for the lifting of four stacks of cartons in a 2×2 pattern, or six stacks of cartons in a 3×2 pattern.

The carrier 110 may be loaded by a single load push lift truck making three trips to load the three stacks of cartons in each of the three load. To do so, the lift truck would position each stack of cartons 82 on its pallet 30 adjacent to one of the load areas 134, 136, 138 of the carrier 110 and use the load push mechanism to push the cartons off the pallet 30 and onto the carrier 110 in like manner as described above, and in a direction generally parallel to the boards 40 comprising the upper surface of the pallet 30 so that the lower surface of the cartons is not abraded excessively.

Of course, if the sum of the thickness of the supports 124 and the base 122 is less than the height of a pallet 30, the pallet 30 may be rested on the surface of the dock proximate to or abutting the carrier 110 while the stack of cartons 82 is pushed from the pallet 30 onto the carrier 110. In such case, the stack of cartons 82 could be pushed onto the carrier 110 without having to rise over the edge of the supports 124. This facilitates the process of pushing stacks of cartons 82 onto the carrier 110.

If the combined height of the base 122 and supports 124 is greater than the height of a pallet 30, the tops of the supports 124 could be angled downward for a short distance at their ends to provide an upwardly-inclined ramp extending from a height lower than or equal to the height of a standard pallet. In such case, even if the upper surface of the pallet were lower than the height of the center portion of the upper surface of the supports 124, the edge of the stack of cartons 82 would slide up the ramped surface of the supports 124 as the stack 82 is pushed onto the carrier by the load push mechanism or other mechanism.

After the stack of cartons has been pushed from the pallet 30 onto the carrier, the blades of the lift truck are still extended under the pallet 30. The lift truck may then retract the load push mechanism, raise the blades, carry the pallet to a holding location where it deposits the pallet 30, and then retrieve another pallet 30 (or multiple pallets 30 in the case of a lift truck provided with multiple sets of forks) carrying a stack (or stacks) of cartons 82 for loading onto the carrier.

To facilitate loading, the carrier may be positioned adjacent a stop 140, such as the curb commonly found along the edge of a dock, or a backstop could be positioned adjacent the landing area for the carrier. The backstop may be of concrete, steel or other materials, so long as it is of sufficient mass and has sufficient traction on the dock to resist any tendency of the carrier 110 to slide backwards when being loaded. The backstop should be capable of engaging the base of the carrier to prevent its sliding and may have a planar vertical surface for resisting the sliding of at least the first layer of cartons in the stack 82 off the back of the carrier. This will make it easier for the operator of the lift truck to avoid pushing the cartons beyond the back edge of the carrier and to prevent the carrier from sliding away from the lift truck as the stack of cartons are pushed onto it.

The speed of loading may be increased by use of a load push lift truck having three pairs of forks and being capable of lifting three stacks of cartons 82 at a time. The stacks of cartons 82 may be positioned with sufficient space between them that the lift truck can pick up three stacks of cartons 82 and push them onto the carrier 110 at the same time with the load push mechanism. Alternatively, however, the lifting mechanism of the load push lift truck could be equipped with a side shift mechanism that moves the outer pairs of blades laterally in unison, and may also be provided with a shifter mechanism that permits the two outer pairs of forks to be moved respectively to the right and left away from the center forks. In such case, the lift truck could pick up three stacks of cartons 82 that are positioned side to side, and, if the base has pairs of cables 132 extending between the load areas 134, 136 and 136, 138, the shifter mechanism could be used to add the space between the stacks 82 needed for the stacks of cartons 82 to clear the middle two pairs of cables 132 that support the base 122 of the carrier. The side shift mechanism could be of assistance in positioning the three stacks 82 laterally with respect to the carrier 110 so that the clearance between the stacks 82 are centered on the middle two pairs of cables 132.

The carrier 110 may then be lifted into the hold 20 of a ship 10 using the ship's gear 12 or other crane. Once in the hold, three-blade lift trucks may be used to unload the carrier by inserting their blades into the channels 126 beneath the stacks of cartons and carrying them to stowage locations as described above. For greater efficiency, the lift trucks may be load push lift trucks that can then deposit the stacks of cartons 82 directly into desired stowage locations. Of course, when picking the stack of cartons 82 up from one of the the 48" side, a three-blade lift truck can provide support to each of the three side-by-side cartons the ends of which abut one another along the 48" side of the stack. The three-blade lift truck may also be used to lift stacks of cartons 82 from one of the 40" sides of a stack, provided the carrier or landing pad has fork channels that will accommodate the use of three blades (see, e.g., the landing pad of FIG. 27).

It has also been found that using three lift truck blades to lift a stack of cartons in the hold of a ship can be beneficial in the carrying and maneuvering of the stack of cartons into a stowage location. In order to prevent thawing of frozen products during loading, the holds may be maintained at a sub-freezing temperature, and ice can form on the blades of a lift truck. During transportation of the stack of cartons 82 in the hold by a lift truck, the stack of cartons may thus slide laterally relative to the lift truck under such icing conditions. Such shifting has been found to be less likely and less serious when the cartons are supported during transportation by three blades rather than two. Modification of the blades to resist lateral sliding may also present a solution to this problem. Flanges or channels running lengthwise along the blade can provide additional resistance to lateral shifting of stacks of cartons on the blades.

When two such lift trucks are used in the hold of a ship, invariably one of them is working in greater proximity to the landing zone in which the cartons are deposited. Thus, one of the lift trucks will frequently return for another load before the other. Thus, it may be desirable to carry three or more stacks of cartons into the hold at a time when using two lift trucks in the hold depending on how quickly the lift trucks can stow them. The addition of a third lift truck may improve the cycle time of the carrier 110 between the hold and dock, since the carrier may be unloaded more quickly.

The base 122 and spreader bar 114 may be shortened or lengthened as desired to accommodate greater or lesser numbers of stacks of cartons or to accommodate wider or narrower stacks of cartons in other stack patterns. A base similar to the base 122 may also be used in another embodiment of the invention for palletless loading of other cargo carriers or for cargo storage facilities, as described in greater detail below.

As mentioned above, a carrier 110 may also be used to depalletize and provide slings around stacks of cartons. The need for the crane or ship's gear 12 to wait for the lift trucks in the hold of a ship to unload a carrier is not present if stacks of cartons 82 are lifted into the hold using slings and landed on a landing pad as described above, since one end of each of the slings may be unhooked from the associated hook and the slings may be drawn from around the stack of cartons 82 even if the lift trucks have not returned to the landing area to carry the stacks of cartons 82 away.

Figure 14:
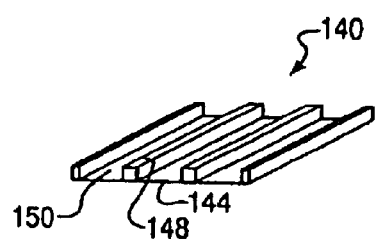
FIG. 14 is a perspective view of a landing pad capable of receiving a single stack of cartons.
Figure 15:
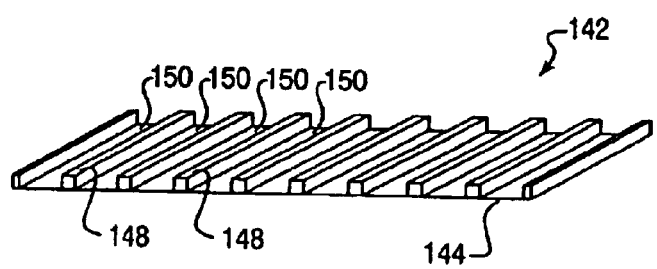
FIG. 15 is a perspective view of a landing pad capable of receiving three stacks of cartons.

FIGS. 14 and 15 depict two such landing pads 140, 142 that are configured to receive up to one stack and three stacks of cartons 82, respectively, at a time. The landing pads 140, 142 of this embodiment comprise a rectangular base 144 on which are mounted a plurality of parallel supports 148 that can support stacks of cartons. The width and locations of the spacers 148 on the base 144 are chosen such that a stack or stacks of cartons 82 landed squarely on the landing pad 140, 142 will be supported in a manner to permit lifting of the stack or stacks of cartons 82 by inserting the blades of a lift truck under the stack to be lifted and lifting it from the landing pad 140, 142. The stack of cartons 82 may then be carried to a stowage location and deposited as described above, and as shown in FIG. 26.

The channels 150 formed between the spacers 148 on the landing pads 140, 142 must be of sufficient depth that the forks of a lift truck can be inserted under the stack of cartons, and must be of sufficient width to receive such blades. As the blades of a lift truck are generally thicker and wider than cargo slings, such dimensions allow the slings to be pulled through the channels without significant resistance.

As shown in FIGS. 14 and 15, the landing pads 140, 142 are configured for use by three-blade lift trucks for removal of stacks of cartons stacked in a three-two pattern as discussed above. That is, the edges of the base 144 perpendicular to the long axis of the spacers 148 are, respectively, about one and three times 48 inches (122 cm) in length. Multiple units of the one-stack landing pad 140 could be bolted or otherwise fastened or positioned together to form a landing pad of sufficient length to receive multiple stacks of cartons 82 if the dimensions of the base 144 and spacers 148 are appropriately chosen.

The landing pad 140, 142 could be provided with two or more channels extending transversely to the supports 148 and channels 150, so that two-blade lift trucks could be used to unload stacks of cartons from the sides of the landing pads 140, 142 having only two channels therein. However, the forks of a two blade lift truck would not typically be of sufficient length to allow their insertion under the center stack of cartons on the three-stack landing pad 142 from either of the ends of the landing pad 142, as the forks would have to be 96 inches (244 cm) in length to reach completely under the stack of cartons 82 in the center position. A landing pad configured to receive three or more stacks of cartons 82 and to have the stacks unloaded by two blade lift trucks from the long edge thereof could be made by adjusting the dimensions of the base 144 of the landing pad, the location of the mounting of the supports and the width and thickness of the supports to provide for landing and lifting of stacks of cartons 82 using two slings and two blades, respectively.

While the carrier 50 or the base 122 of the carrier 110 or other such structure may be used to depalletize and provide slings about stacks of cartons 82 at dockside for lifting into the hold of a ship, it is also possible for the crane or ship's gear to be held up waiting for a full load of stacks of cartons to be readied for lifting into the hold of the ship. Multiple carriers 50 or bases 122 or the like could be used to provide surge capacity for the crane or ship's gear. However, it is more efficient for a crane or ship's gear to return to a single location rather than having to return to multiple locations. In particular, gear used on many ships includes twin booms, one positioned over the hatch and one positioned over the loading area. Winches on each boom take in or let out their cable, as appropriate, to lift or land cargo at specific, chosen locations, so that little effort is required to pick up and deposit cargo at the two chosen locations.

Figure 16:
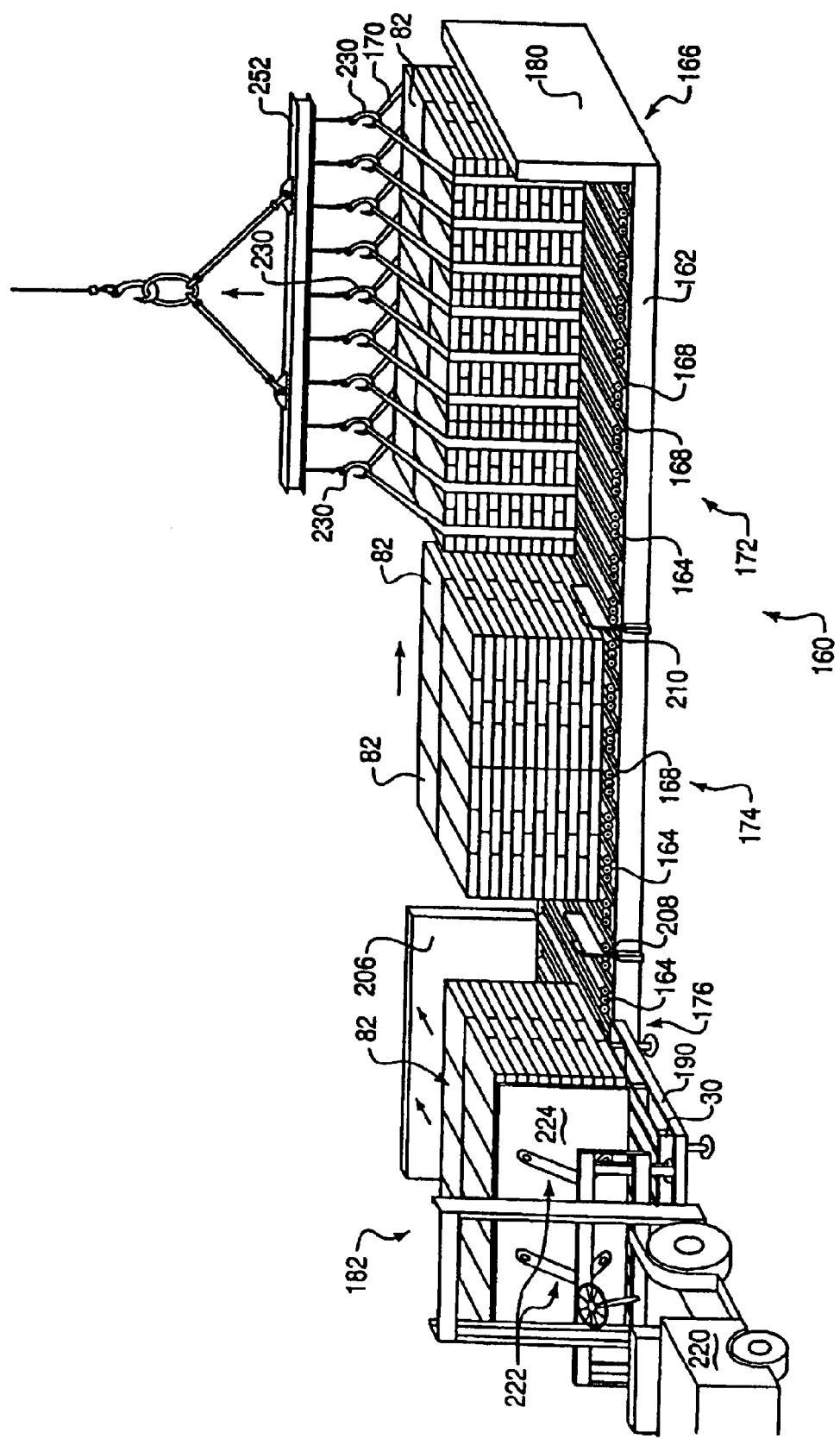
FIG. 16 is a perspective view of a roller deck according to one embodiment of the invention, showing three stacks of cartons being removed at the slinging end and two stacks of cartons being loaded from the side onto the roller deck at the loading end.

In another embodiment of the invention, and referring to FIGS. 16–19, surge capacity for picking up one or more stacks of cartons at a time is provided by use of a roller deck that may also provide queuing capacity. The roller decks of FIGS. 16–19 may be loaded either from the side or from the end, as discussed below. As shown in FIG. 16, a roller deck 160 according to this embodiment comprises a base 162 on which a plurality of rollers 164 are rotatably mounted. The rollers 164 are mounted with their rotational axes transverse to the long edge of the base 162, and may be of a length sufficient to extend across the entire width of the roller deck 160, or may be segmented or may consist of a plurality of separate wheels rotatably mounted on the roller deck 160 with parallel rotational axes. The rollers provide a low-friction transport surface so that stacks of cartons may be moved along the length of the roller deck 160. This conveying of the stacks of cartons may be accomplished manually, with the assistance of gravity, or under power. At the lifting (unloading) end 166 of the base, channels 168 are formed between sections of rollers 164 by spacing the rollers 164 sufficiently that a cargo sling 170 or the blades of a lift truck can be inserted into the channels 168 under a stack of cartons 82. The upper portion of the long edge of the base 160 could be cut away at the location of such channels to provide additional depth for insertion of the blades of a lift truck.

If desired, channels could be formed by using segmented rollers spaced to form channels transverse to their rotational axes, aligned portions in which the diameter of the rollers is decreased sufficiently to form useful channels, or, where wheels are used as rollers, the wheels could be omitted in certain areas to form such channels, such that lift truck blades or slings could be extended under the stack of cartons.

The base 160 may be made in several sections, such as a lifting section 172, a queuing section 174, and a loading section 176 for convenient transportation and storage of the apparatus (the loading section 176 actually constitutes a queuing section in such case, in addition to the queuing section 174, since a stack of cartons loaded thereon may be conveyed by the rollers to the queuing section 174 and on to the loading section 176). Of course, the queuing and loading sections 174, 176 could be eliminated if queuing is not desired, and the lifting section 172 could be loaded directly by the lift trucks However, this embodiment of the invention will be described in connection with a base 160 having lifting, queuing and loading sections 172, 174, 176 as it may be advantageous in many circumstances to provide the queuing capacity to reduce the likelihood that either the crane or the loading lift truck will be required to wait for action by the other.

These sections 172, 174, 176 could be aligned and fastened together, as by using bolts or pins, when the roller deck 160 is to be used. Multiple loading and lifting sections 172, 176 could be provided with different patterns of spacing of the channels 168 that could be selected according to the particular needs of the ship and cargo. These sections 172 could be attached to the other sections as desired, to provide flexibility to the planners based on considerations relating to the cargo, the ship, the available lift truck and other equipment and other factors. Different slinging or lift truck blade spacings could then be used to lift stacks of cartons 82 from the roller deck 160, as desired. The width of the roller deck 160 should be chosen to accommodate the width of the various stacks of cartons and other articles that may be deposited thereon.

An end stop 180 may be mounted to the base at the lifting end 166 of the roller deck 160. The stop 180 limits the travel of stacks of cartons 82 or the like along the bed of rollers 162 of the roller deck 160, thus retaining the stack of cartons 82 on the roller deck 160, and allows the repeatable positioning of the stacks of cartons for lifting from the roller deck 160 for stowage. The stop 180 should be of sufficient strength, width and height that it can stop the travel of a stack of cartons 82 traveling along the roller deck 160 at a normal velocity without causing damage, excessive distortion of the stack (as by one or more layers of cartons sliding relative to other layers) or loss of cartons from the upper layers. The stop may be of a single piece, or may be segmented to allow insertion of the blades of a lift truck under a stack of cartons on the lifting section.

The upper surface 184 of the roller deck may be level or inclined. If the roller bed is sufficiently inclined, the stacks of cartons can roll from the loading end 182 of the roller deck 160 to the lifting end 166 without the need for any mechanism to urge them toward the stop 180. The roller deck 160 may be built with such an incline, may be supported by a plurality of adjustable legs (not shown) along its length, or may have spacers inserted beneath the base 162 at positions along its length to support the base 162 and upper surface Should any of the stacks of cartons 82 require assistance to reach the lifting end 166 of the roller deck 160, the incline facilitates the manual pushing of the stack 82 to the lifting end 166 of the roller deck by a worker or workers. A worker may also be tasked with pushing the stacks of cartons along the rollers 162 of a level roller bed 160 having a level upper surface 182, or the rollers could be powered to transport stacks of cartons along the roller deck 160.

Figure 17:
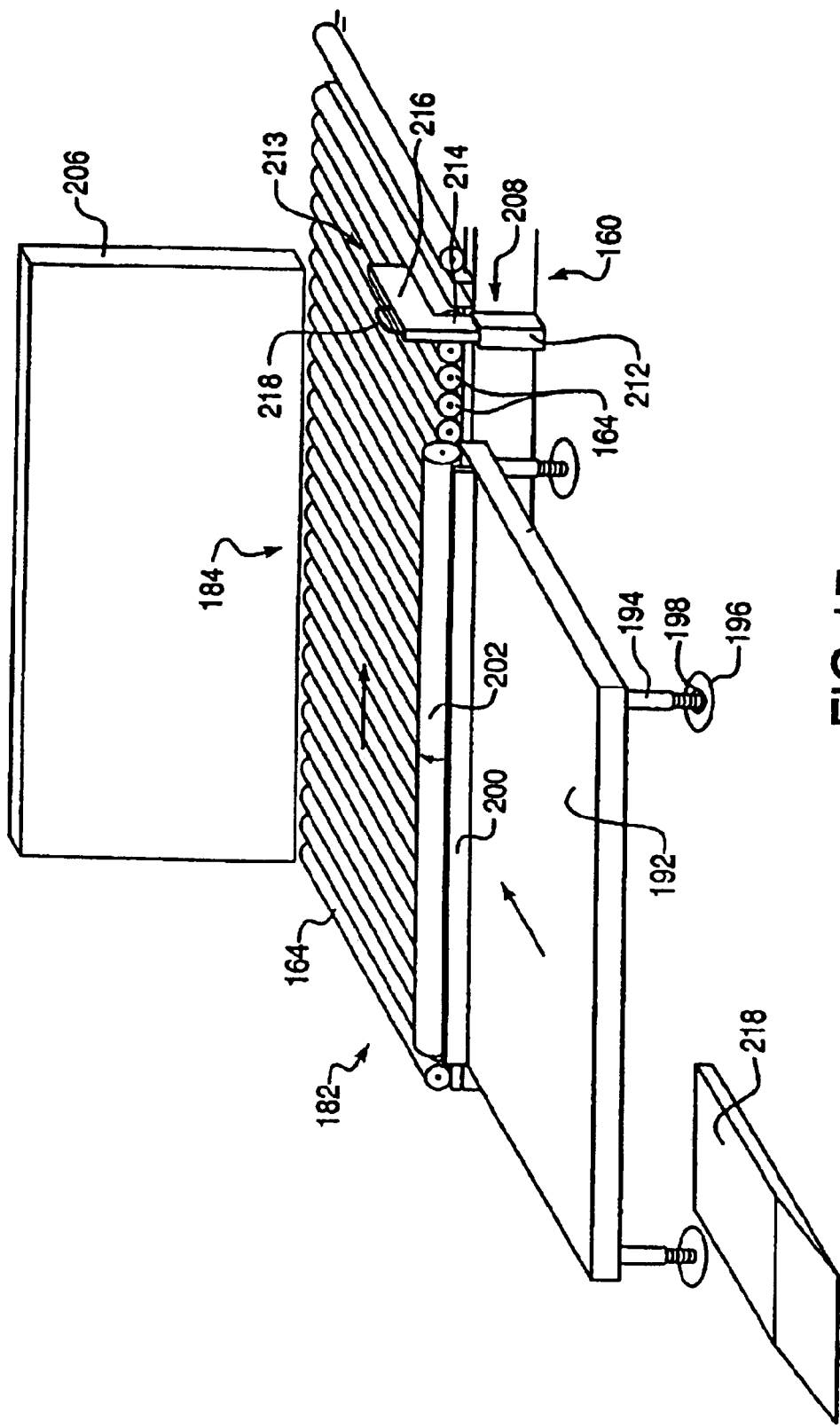
FIG. 17 is a perspective view of a pallet table positioned adjacent one side of a portion of a roller deck.

Stacks of cartons 82 may be loaded onto the roller deck 160 from the side. As shown in FIGS. 16 and 17, a pallet table 190 may be provided to facilitate the positioning of pallets 30 bearing stacks of cartons 82 relative the roller deck 160 at the appropriate height and in the appropriate plane. The pallet table 190 may be bolted or otherwise affixed to the roller deck 160, in which case, the vertical distance between the upper surface 192 of the pallet table and the adjacent upper surface 184 of the roller deck 160 should be approximately equal to the thickness of a pallet so that the bottom of a stack of cartons being pushed from the pallet 30 onto the roller deck 160 will not have to rise in the process of the transfer from the pallet 30 to the roller deck 160.

The pallet table 190 may be supported by adjustable legs 194 which support it at the appropriate height and tilt relative to the surface of the dock and the plane of the adjacent upper surface 182 of the roller deck 160. The legs 194 may include a screw portion 196 that may be rotated to adjust the length of the leg 194. A nut 198 may be affixed to the screw portion 196 of the legs 194 to facilitate adjustment thereof. A plurality of such legs 194 may be used to support the base.

The plane of the upper surface 192 of the pallet table 190 may either be level with the surface on which it is placed, such as a dock, or leveled with the upper surface 184 of the roller deck 160 or otherwise. If the upper surface 184 of the roller deck 160 is tilted with respect to the surface on which it is placed, then the legs 194 may be adjusted to tilt the upper surface 192 of the pallet table 190 such that it is in a plane parallel to that of the upper surface 184 of the roller deck 160. Depending on the width of the pallet table, one or more stacks of cartons 82 may be pushed onto the loading section 172 of the roller deck 160 at a time, as shown in FIG. 16.

A pallet stop 200 may be attached at the rear portion of the pallet table. A pallet 30 may be pushed into engagement with the pallet stop 200 such that it is proximate to a roller 202 rotatably mounted either to the roller deck 160 or to the pallet table 190. To facilitate loading, the upper surface of the roller 202 may be mounted such that it is equal to or higher than the plane of the upper surface 184 defined by the rollers 164 of the loading end 182 of the roller deck 160.

A loading stop 206 may be mounted to the roller deck 160 along the edge opposite to the pallet table 190. The loading stop should be of sufficient height and width to stop stacks of cartons from moving too far across the roller deck 160 and to provide indexing for the stacks of cartons 182 to align them with the long axis of the roller deck.

One or more stops 208, 210 may be provided to limit the travel of stacks of cartons 82 along the roller deck 160. Many different types of stops may be used. In the present embodiment, two flag stops 208, 210 are provided. These stops comprise a square tubular receiver 212 mounted to the roller deck 160, and a flag stop portion 213 comprising a square tube shaft 214 that can be inserted into the receiver 212, a flag portion 216 mounted on the shaft for engaging stacks of cartons traveling along the roller deck 160 and a handle 218 for removing the flag stop portion 213 from engagement with the receiver 212. The shaft 214 may be inserted into the receiver such that the flag portion 216 extends transversely over the rollers 164 of the roller deck 160 for stopping movement of stacks of cartons 82 along the roller deck 160, and may be removed from the receiver 212, rotated from such orientation and inserted such that the flag portion does not block the progress of stacks of cartons 82 moving along the roller deck 160. Other types of stops, such as stops insertable into, or raisable above the upper surface of, the roller deck 160 through gaps between adjacent rollers, roller brakes that stop rotation of one or more rollers at desired stop locations and the like may also be used. Alternatively, sections of rollers 164 could be selectively powered to rotate and move the stacks of cartons 82 along the roller bed 160 to desired locations.

While the stops 200, 206 may be used to restrain the pallet against movement toward the roller deck 160 during loading of the roller deck 160, the lift truck may also carry restraints, as described below, to retain the pallet on the forks of the lift truck and restrain motion of the pallet toward the roller deck 160.

If the upper surface 192 of the pallet table is tilted relative to the plane of the surface on which the pallet table 190 is positioned, a wheel ramp 218 may be positioned proximate to the higher side of the pallet table 190 such that a wheel of the lift truck 220 can be driven onto it to tilt the lift truck by an angle to level the forks of the lift truck with the pallet table 190.

The roller deck 160 of the present embodiment may be used as follows, load push lift truck carrying one or more stacks of cartons 82 on pallets 30 raises the pallets 30 above the level of the upper surface 192 of the pallet table 190, positions the stacks of cartons above the pallet table 190 and lowers the pallets 30 onto the upper surface 192 of the table 190. The operator of the lift truck 220 then engages the load push mechanism 222 of the lift truck to push the push plate 224 forward relative to the pallet table and slide the stacks of cartons 82 over the roller 202 and onto the roller deck. The stacks of cartons 82 may be pushed into engagement with the load stop 206 to align them with the long axis of the roller deck 160. The stacks of cartons then move or are moved along the roller deck to a position intermediate the ends 166, 182 of the roller deck 160 where they may be held by the flag stop 210 and queued for moving to the lifting end 166 of the roller deck.

Cargo slings 170 may be placed in the channels 168 prior to movement of stacks of cartons 82 into position above them, or may be pushed or pulled through the channels 168 between the rollers by a hooked rod or the like. Once the desired number of stacks of cartons 82 are moved into position, with the endmost stack 82 abutting the end stop 180, the ends of the cargo slings 170 may be attached to the cargo hooks 230 of a spreader bar 232. The spreader bar 232 can then lift the stacks of cartons off the roller deck 160 and carry them into the hold of a ship. Alternatively, the stacks of cartons could be removed from the roller deck by a lift truck, that would insert its blades into the channels 168 and lift the stack or stacks of cartons 82 from the roller deck.

Further, the roller deck could be modified in the lifting zone by segmenting the rollers such that a plurality of axially aligned rollers extend across the roller deck 160, and providing space between such rollers to form channels therebetween for slings or lift truck blades extending transversely of the rotational axes of the rollers 164. Rollers could also be formed with reduced diameters at selected locations to form such channels, or, if the rollers comprise a plurality of wheels, such wheels could be spaced or omitted to form such channels. Such channels may be in addition to or in lieu of the channels 168 into which slings or lift truck blades may be extended. In order to facilitate use of the channels extending transversely to the rotational axis of the rollers 164, the backstop 180 may be eliminated or modified so that it did not interfere with the inserting of the slings or lift truck blades into the channels or the lifting of the stack of cartons from the roller bed 160. Flag stops, or a series of upstanding stops could be used for this purpose. Such a roller bed 160 could be used in the hold of a ship or elsewhere to provide a landing pad with queuing. In such case, channels parallel and perpendicular to the rollers could be provided that would allow the landing of multiple stacks of cartons 82 on the roller deck 160 at one end, and the lifting of such stacks of cartons at that end or at the other end. In the latter case, the stacks of cartons could be rolled along the bed 160 to the other end to make room for the landing of more stacks of cartons 82 on the one end.

The roller deck 160 can be made in various lengths. Longer roller decks 160 can provide queuing of stacks of cartons to reduce delays of the ship's gear or other crane mechanism in waiting for a complete load to be presented. In the present embodiment, moreover, the roller deck 160 may be loaded with two stacks of cartons 82 at a time, while the spreader bar is adapted to carry three stacks of cartons 82 at a time. Thus, with its third load, the lift truck 220 would have deposited two loads for the crane or ship's gear to carry into the hold of the ship. The roller deck 160 may also be used as a queuing landing pad for use in the hold of a ship. In such case, channels could be provided in the loading area 176 in like manner to the channels 168 provided in the lifting section 172

It should be noted that the normal three-two stacking pattern of cartons on a 40"×48" (102 cm×122 cm) and the orientation of the boards forming the top of the pallet may result in the slings 90 passing under the stack of cartons in the 40" (102 cm) direction. In such case, three slings 90 would be needed per stack 82, as the three side-by-side cartons of a layer should each be supported by a separate sling. When slinging under the 48" (122 cm) width of the stack 82, only two slings are needed.

Figure 18:
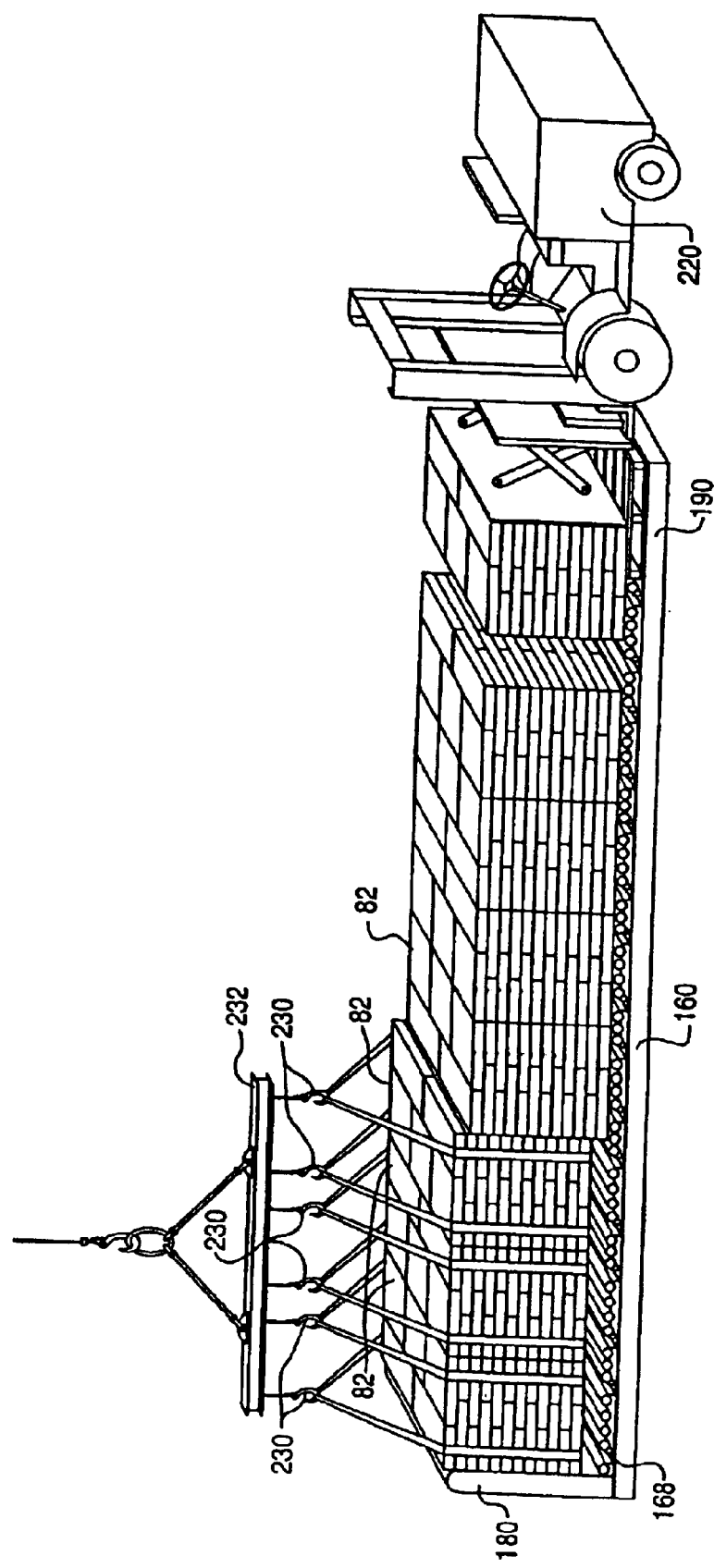
FIG. 18 is a perspective view of an end-loading roller deck being loaded by a load push lift truck.
Figure 19:
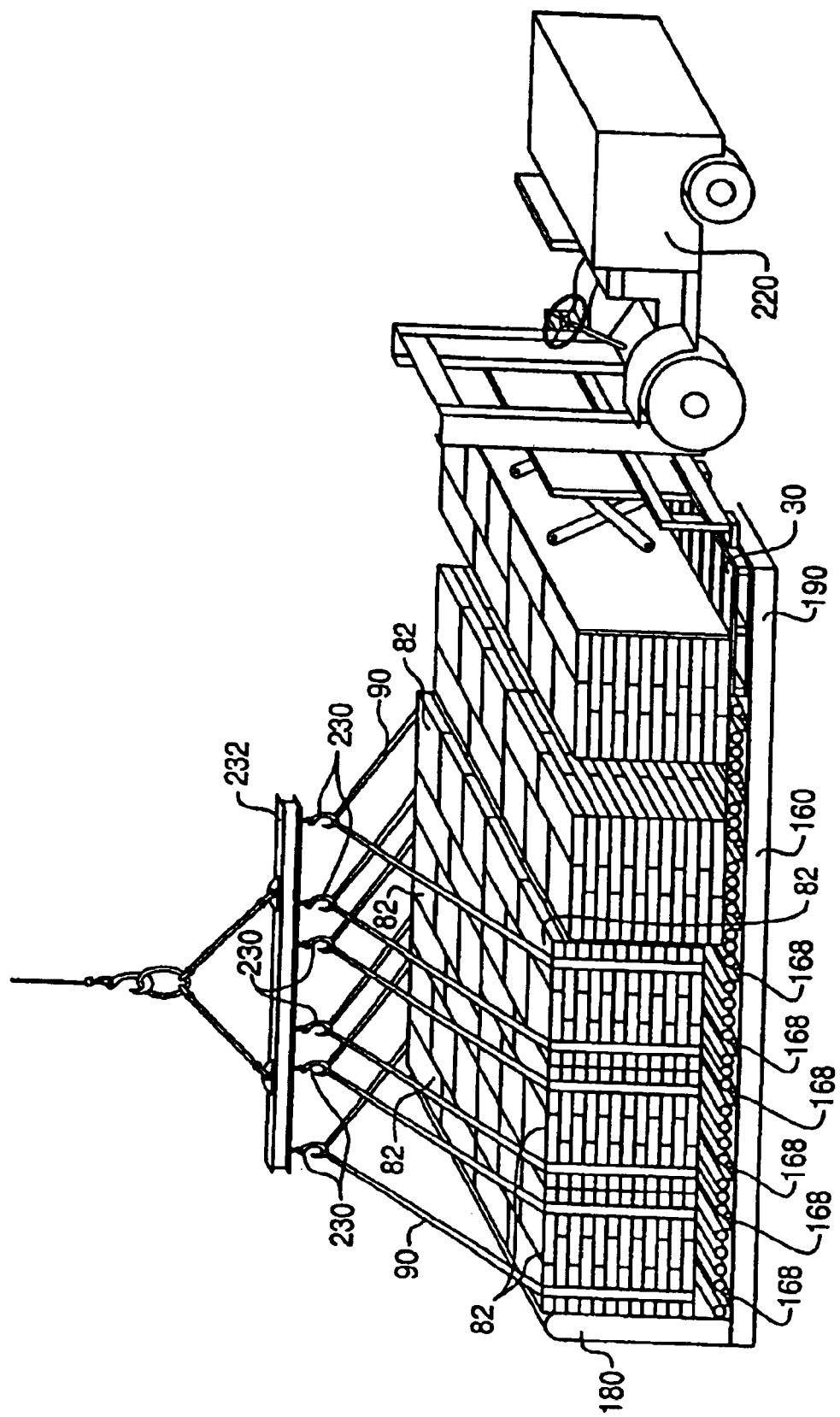
FIG. 19 is a perspective view of a double-wide, end-loading roller deck being loaded by a load push lift truck.

End loading of a roller deck 160 can be accomplished by positioning the pallet table 190 adjacent the end of the roller deck 160, as shown in FIGS. 18 and 19. Referring to FIG. 19, the pallet table 190 may be made to accommodate two pallets at a time to be received from a double-wide load push lift truck 220. The double-wide roller deck 160 can be made as a double-wide unit, or may comprise two single-wide units that are positioned side by side. The slings 90 used to lift two stacks of cartons at a time, of course, would be longer than required for lifting a single stack of cartons at a time. The stretch-wrapping of the stacks of cartons 82 can facilitate the lifting of two stacks of cartons 82 at a time by a single pair (or set of three) cargo slings 90.

Figure 20:
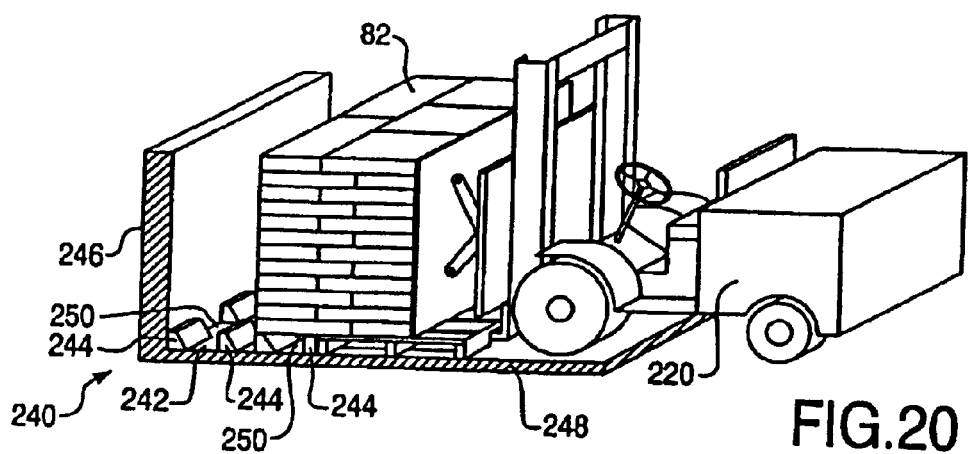
FIG. 20 is a perspective view of a depalletizer being loaded with a stack of cartons by a load push lift truck.
Figure 20A:
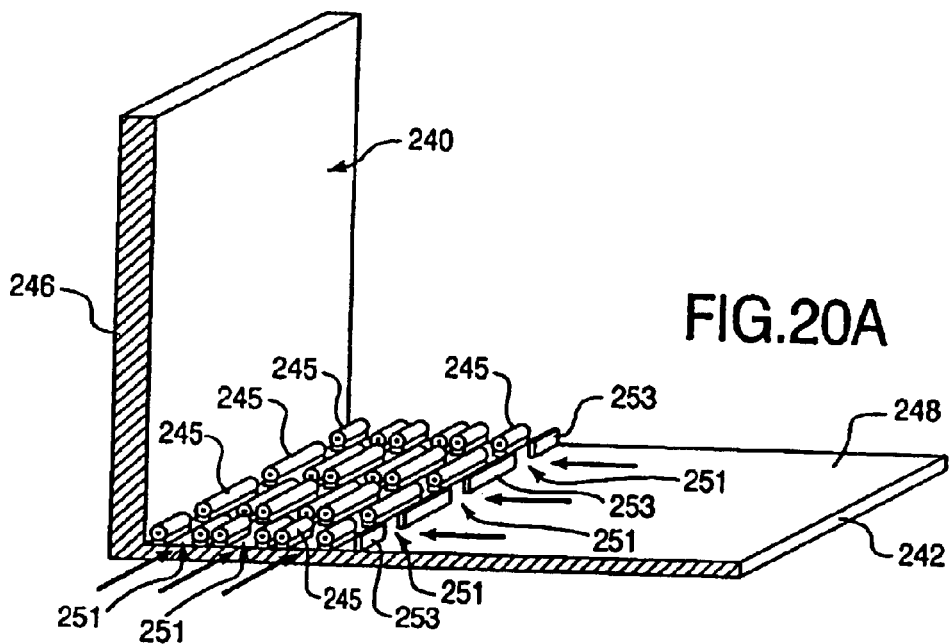
FIG. 20A is a perspective view of a roller depalletizer.
Figure 21:
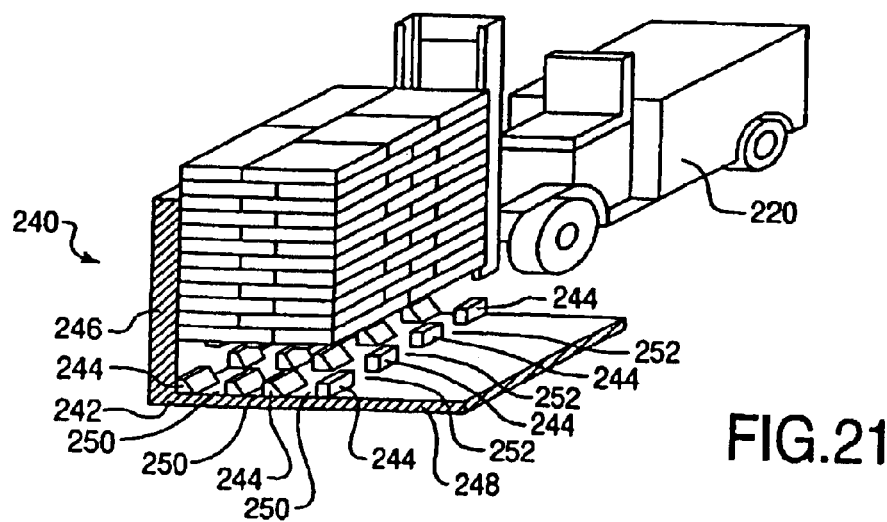
FIG. 21 is a perspective view of a stack of cargons being removed from the depalletizer of FIG. 20 by a lift truck.
Figure 22:
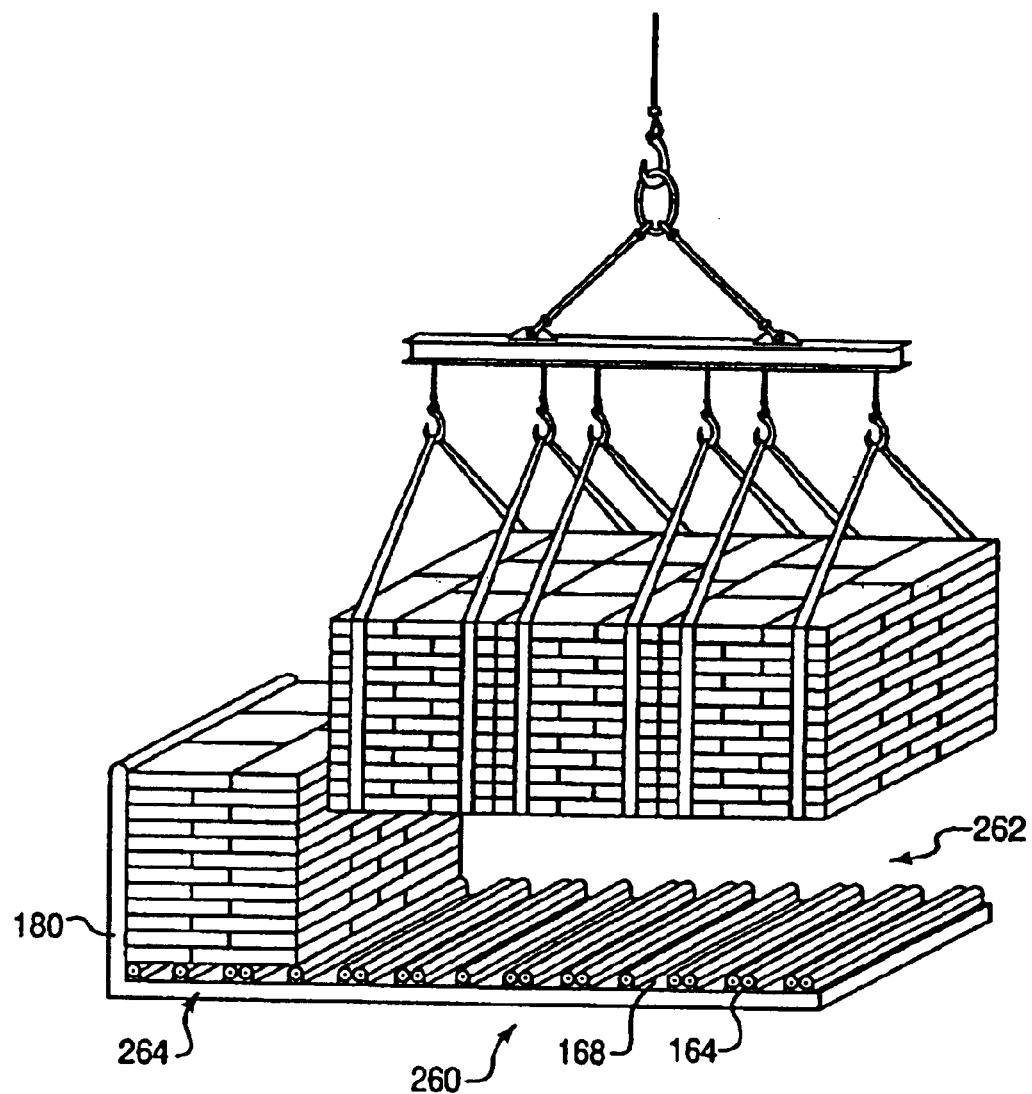
FIG. 22 is a perspective view of a roller landing pad.
Figure 23:
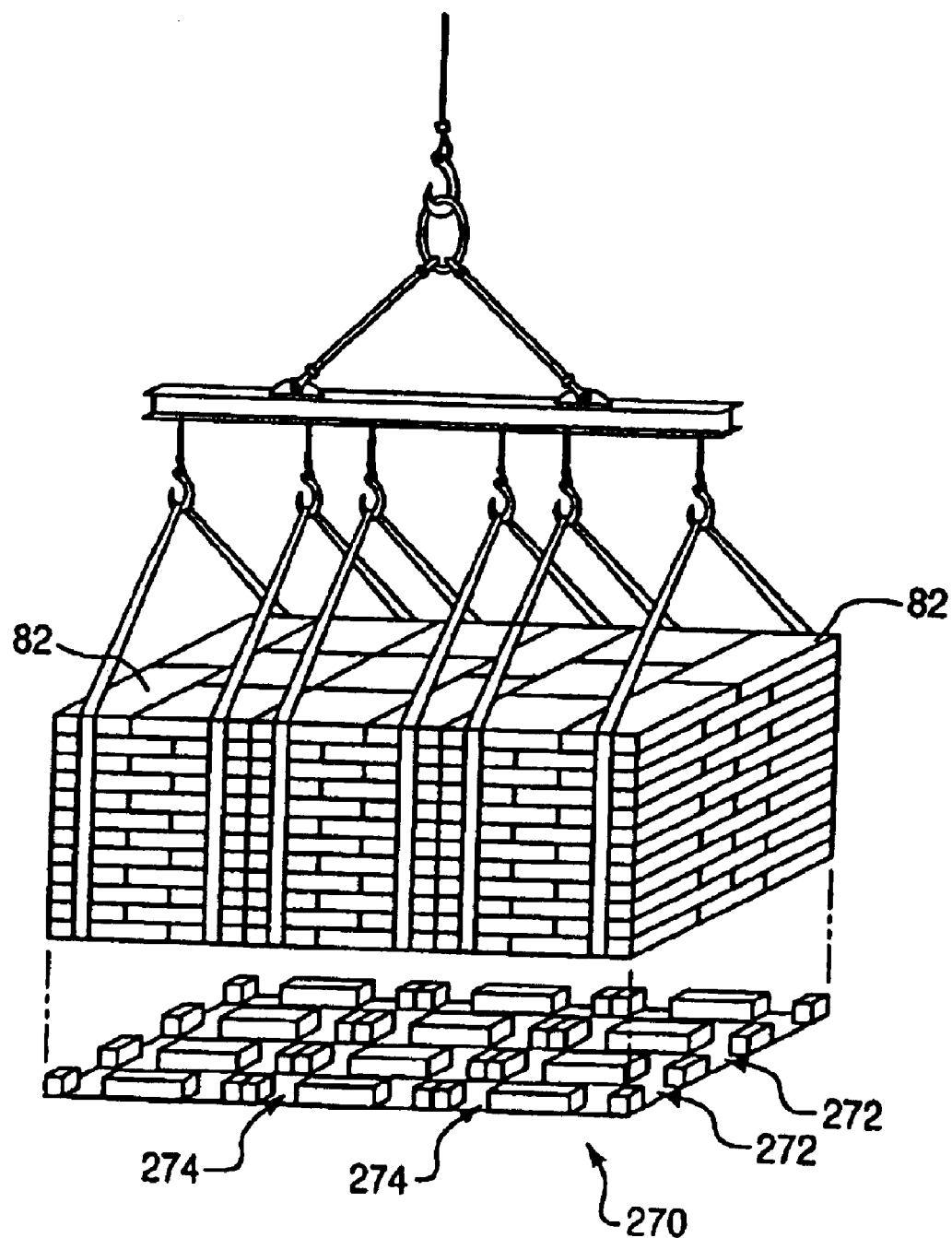
FIG. 23 is a perspective view of a landing pad with fork channels for lifting stacks of cartons from either the 40" or 48" side of stacks of cartons.

As mentioned above, despite the weight of the stacks of cartons 82, the base 52, 122 may be used to depalletize them without the need for use of a slipsheet. Stacks of cartons 82 could be lifted into the hold of a ship from the base 50, 122 or from depalletizer platforms having similar channels for slings and/or lift truck forks. Referring to FIGS. 20, 20A and 21, such depalletizer platforms 240 may include a base 242 having a plurality of supports 244 similar in function to the supports 124, 148 of the carrier 110 and landing pads 140, 142. A backstop 246 may be provided to assist the operator of a lift truck 220 to position stacks of cartons on the upper surfaces of the supports 244 of the depalletizer platform 240. The platform 240 could also be positioned adjacent a curb or free-standing backstop, as described in connection with the carrier 110 of FIG. 11 to facilitate loading and to resist sliding of the depalletizer platform 240. The base 242 of the depalletizer platform 240 may also include a pallet apron 248 of sufficient size that the wheels of a lift truck carrying a loaded pallet 30 would be driven onto a portion of the apron 248 when a pallet 30 is moved into abutment with the outermost of the spacers 244. The weight of the lift truck 220 bearing on the apron 248 should control any tendency of the depalletizer 240 to slide away from the lift truck 220 as the stack of cartons 82 is pushed from the pallet 30 onto the depalletizer 240. The outward-facing edge (the edge remote from the backstop 246) of the supports 244 may be beveled to facilitate pushing of the stack of cartons 82 onto the supports 244. The lift truck 220 may then retract the load push mechanism, lift the empty pallet on the blades of the lift truck 220 and take the empty pallet to a holding or stowage location.

While the stops 200, 206 provide an effective means for restraining the pallet against motion when the stack of cartons 82 is pushed onto the roller deck 160, other types of restraints could be used. For example, as shown in FIGS. 28 and 29, restraints can be mounted on the lift truck. Referring to FIG. 28, the restraint 300 comprises a metal bar of generally triangular cross section mounted on the blades 302 of a lift truck. The rear surface of the restraint of this embodiment extends vertically upward from the blade. The forward surface of the restraint slopes upward and rearward relative to the blade to facilitate insertion of the blade 302 and restraint into a 4-way channel of a standard pallet. The restraint is mounted on the blade 302 toward its rear, such that when the restraint is inserted into a 4-way channel of a pallet 38, and the blade 302 of the lift truck is raised, the back of the restraint 300 can engage the upper portion of the inner surface of the side beam 34 of the pallet 38 to restrain the pallet against movement off of the blade 302. The pallet can be released by lowering the blade 302 and pallet 38 onto a surface. The blade can then be withdrawn from the 4-way channel 42 of the pallet 38.

A pallet stop 304 may also be mounted on the blade 302. The pallet stop 304 in the present embodiment is of rectangular cross section and may have a length greater than the width of the 4-way channel in the side beam 34 of the pallet and a height above the blade 302 that is greater than the height of the 4-way channel so that the pallet stop may engage the side beam 34 of the pallet 38 when the blade 302 of the lift truck is inserted into the 4-way channel of the pallet 38. The pallet stop is positioned such that its forward surface is forward of the forward surface of the push plate 224 when the push plate 224 is fully retracted, and prevents the blade 302 from being pushed so far into the 4-way channel of the pallet 38 that the back edge of the pallet 38 (the leftmost edge as shown in FIG. 28) is forward of the front surface of the push plate 224 when the push plate 224 is fully retracted. The restraint 300 and pallet stop 304 may be mounted to the blades 302 of the lift truck and may be attached by a variety of means including bolts or clamps, or by welding. Of course, there must be sufficient clearance between the upper surface of the blades 302 of the lift truck and the lower edge of the push plate 224 so that the push plate can be extended over the top of the pallet 38.

In another embodiment, and referring to FIGS. 29 and 30, a retaining apparatus 310 is mounted on a lift truck 220. This restraint 310 comprises a housing 312 extending transversely relative to the blades 302 of the lift truck 220. The forward surface of the housing 312 serves as a pallet stop in a manner similar to the pallet stop 304 shown in FIG. 28. Grippers 314 are slidably mounted in each end of the housing 312 and are extendable and retractable relative to the housing 312 by a hydraulic cylinder. According to this embodiment, the pallet-engaging portion 316 of the grippers 314 is L-shaped, with the distal end portion 318 of the gripper of the pallet-engaging portion 316 forming a right angle with the lateral portion 320 of the pallet engaging portion 316.

The restraint 310 may be operated by the driver of the lift truck to extend and retract the grippers 314, as by a hydraulic cylinder 322 mounted in the housing 312. The horizontal distance between the forward surface of the housing and the distal end 318 of the pallet-engaging portion 316 of the grippers 314 should be greater than the thickness of the side beams 34 of a pallet 38 when the grippers are in their extended position. The distance between the distal ends 318 of the grippers 314 in the extend position should be greater than the length of the side beam 34 of a pallet 38 and less than the length of the side beam 34 when the grippers 314 are retracted. The distal ends 318 of the pallet-engaging portion 316 of the grippers 314 can thus be inserted into the fork channels 44 of a pallet 38 to restrain the pallet 38 from moving off the blades 302 of the lift truck when a stack of cartons 82 is pushed from the pallet 38.

In the embodiment depicted in FIGS. 20 and 21, the depalletizer is configured to hold a stack of cartons 82 with a width of 48" (122 cm), the width extending parallel to the backstop 246, and a depth of 40" (102 cm). However, it could be configured to receive stacks of other sizes or orientations as desired.

In use, a load push lift truck positions a palletized stack of cartons 82 with the far edge of the pallet 30 adjacent the outermost of the supports 244. The load push mechanism is then engaged, pushing the stack of cartons 82 from the pallet 30 onto the upper surfaces of the supports 244. Slings can be positioned in the transverse channels 250 or longitudinal channels 252 to lift the stack of cartons 82 from the depalletizer. However, the stack 82 may also be removed from the depalletizer by the blades of a lift truck inserted into the transverse or longitudinal channels 250, 252 formed between the spacers 244. For lifting a 40"×48" (102 cm×122 cm) stack of cartons 82 from the front of the depalletizer 240, with the 48 inch (122 cm) edge being the front edge of the stack 82, a three-blade lift truck may be used with the transverse spacing of its blades adjusted such that each one supports a separate one of the three side-to-side cartons in the bottom layer of the stack of cartons 82. A two- or three-blade lift truck 220 may be used to lift the stack of cartons 82 from the depalletizer 240 by inserting its blades into the transverse channels 250.

The depalletizer platform 240 could be configured with a depth of 48 inches (122 cm) and a width of 40 inches (102 cm) if desired, and if the pallet 30 is provided with a smooth upper surface, such as a plastic, plywood or metallic surface that permits pushing the stack of cartons 82 off the pallet 30 in a direction parallel to the 48" (102 cm) edge of the pallet 30. The depalletizer platform 240 could also be sufficiently wide to accept multiple stacks of cartons 82 at a time. As shown in FIG. 20A, rollers 245 (or a plurality of wheels) could be used in a platform in place of the supports 244 to facilitate loading, with channels 251 being formed between rollers by segmenting each of the rollers into a plurality of segments and providing space between segments that can receive the blades 290 of a lift truck 220, by using wheels as rollers, and omitting and/or spacing the wheels apart in the areas where channels are desired, and so forth. An upstanding plate or series of plates 253 may be attached to the base 242 to provide a pallet stop against which a pallet to be unloaded may be placed.

In one embodiment of the invention, a depalletizer platform 240 is used for the loading of a shipping container or the like. The interior width of refrigerated shipping containers varies. Containers with interior widths of from a little more than 88 inches (224 cm) to more than 90 inches (229 cm) may be found. Such containers may be loaded by depositing pairs of stacks (or rows of stacks) of cartons 82 in their interior side by side with the 40 inch (102 cm) side of the stack 82 being oriented perpendicular to the side wall of the container ("40+40 loading"). The remainder of the width may be hand stacked in the remaining space between the stacks 82 or between a stack 82 and the wall of the container. The stacks 82 could also be positioned with one stack (or row of stacks) having its 48 inch (122 cm) side and one stack 82 (or row of stacks) with its 40 inch (102 cm) side perpendicular to the side walls of the container ("48+40 loading").

As mentioned above, load push lift trucks that are used to push stacks of cartons 82 from the pallets onto a carrier 110 or depalletizer platform 240 must have push mechanisms with sufficient clearance over the blades so that the push mechanism does not engage both the stack of cartons 82 and the upper portion of the pallet 30. The lift trucks that lift the stacks of cartons 82 from a landing pad 140, 142, carrier 50, 110 or depalletizer 240 have the bottom layer of the stack of cartons 82 resting on the blades of the lift truck 220. As such, if the push plate of the lift truck has a clearance of, for example, 4 inches (10 cm) over the blades, the push plate may not engage the bottom layer of the stack of cartons. This may be particularly important in the event that the stack of cartons are not wrapped with plastic wrap or the like. Thus, the lift trucks used in the hold of a ship may have load push mechanisms with lower edges having less clearance over the blades.

In another embodiment of the invention, the loading of a container can be accomplished using a depalletizer platform 240 and one or more lift trucks 220. For 40+40 loading, a single, two blade load push lift truck could be used as follows. The lift truck 220 positions a palletload of cartons 82 on the depalletizer 240 and uses its load push mechanism to push the stack of cartons 82 onto the supports 244 of the depalletizer 240. The lift truck 220 may then retract the load push mechanism and deposit the pallet 30 in a holding area. The blades 272 of the lift truck can then be inserted in the transverse channels 250 of the depalletizer platform 240, and the stack of cartons 82 may be lifted from the depalletizer and carried to a stowage location in a container or the like. The stack of cartons 82 may then be deposited in the stowage location using the load push mechanism of the lift truck.

For 48+40 loading, a two-blade and a three-blade lift truck could be used. The lift truck with three blades would insert its blades into the longitudinal channels 252 of the depalletizer 240, and lift and carry the stack of cartons 82 to its stowage location. The two blade lift truck could then use the transverse channels 250 to insert its blades under a stack of cartons 82 and to lift and carry it into a container or the like. The load push mechanism could then be used to deposit the stack of cartons 82 in the desired stowage location. A container could thus have two parallel rows of 40 inch (102 cm) and 48 inch (122 cm) width, respectively. If the stacks of cartons 82 are of such height that they can be stacked on top of one another within the container, then a second stack of cartons 82 may be brought into the container by the lift truck 220 and deposited on top of a first such stack by the load push lift truck. If the stacks of cartons 82 are of such height that their combined height exceeds the interior height of the container, layers of cartons may be removed from stacks of cartons 82 that have been deposited in their stowage location and may be hand stowed to fill in other space in the container. After removal of sufficient layers of cartons from the stack 82, a full stack can be deposited on top of the remaining layers in order to take advantage of the headspace in the container.

According to another embodiment of the invention, the backstop of the depalletizer 240 may be taller than a stack of cartons to facilitate placing of one stack on top of another. In such case, the lift truck may position the pallet carrying a second stack of cartons 82 at approximately the level of the top layer of cartons in a first stack that is resting on the depalletizer 240. The load push mechanism may then be used to push the stack of cartons 82 off the pallet and onto the top of the first stack of cartons 82. If desired, one or more layers of cartons could be removed from the first stack of cartons 82 so that the combined height of the first and second stacks of cartons 82 are of the desired final height, such as the maximum height of a stack of cartons that can be loaded into a cargo container.

In accordance with another embodiment of the invention, a load push mechanism is modified to include a gate section 282 on the lower edge of the push plate 280. The gate section 282 may be hydraulically activated, and may be of a type that does not interfere with the operation of the load push mechanism. For example, as shown in FIGS. 24 and 25, a hinged gate 284 or a telescoping gate 286 may be movable by one or more hydraulic cylinders 288 between positions in which the lower edge 298 of the gate 284, 286 is proximate to the blades 290 of the lift truck 220.

Figure 24:
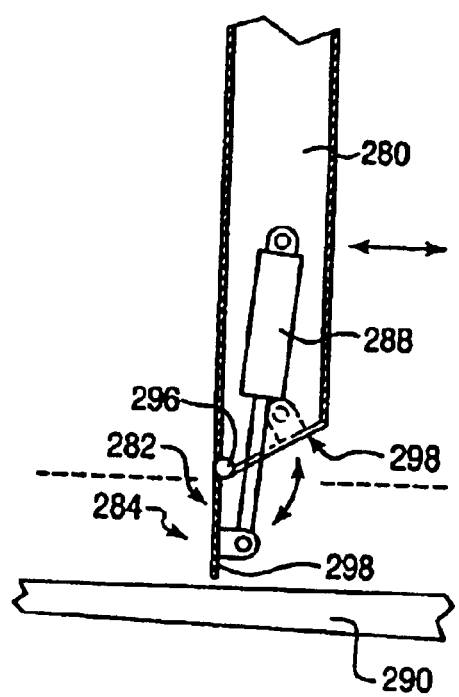
FIG. 24 is a sectional side view of a push plate for a load push lift truck having a hinged lower gate.
Figure 25:
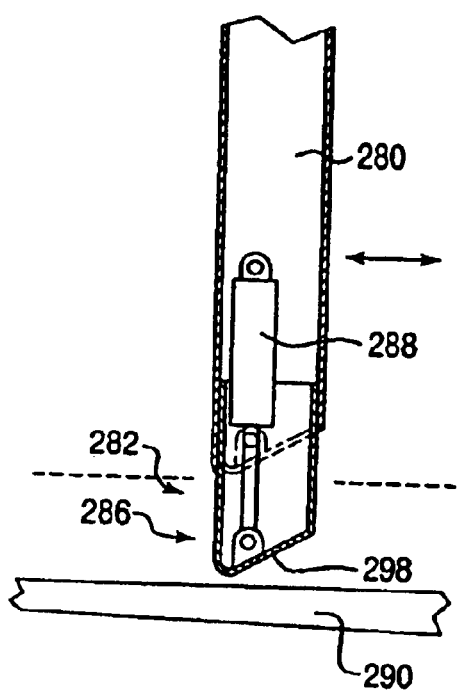
FIG. 25 is a sectional side view of a push plate for a load push lift truck having a telescoping lower gate.

The gate 284, as shown in FIG. 24, is pivotably mounted to the push plate 280 by a hinge 296. The hydraulic cylinder 288 is pivotably connected at its ends between the gate 284 and the push plate 280 such that, in its fully extended position, the push plate is pivoted to a position in which it is parallel to the face of the push plate 280. When the hydraulic cylinder 288 is retracted, the gate 284 is raised to provide maximum clearance between the upper surface of the blades 290 of the lift truck 220 and the push plate 280. Thus, the gate 260 can be lowered to engage the bottom layer of a stack of cartons 82 being carried on the forks 290 of a lift truck 220, for example, for depositing in a stowage location, or it can be raised to provide clearance so that the push plate may be extended to push a stack of cartons 82 from a pallet, for example, onto a depalletizer such as carrier 50, 110, roller deck 160 or depalletizer 260 with the forks 290 in the 4-way fork channels.

The gate 284 operates in a similar manner, except that it is slidably mounted in and telescopes into the lower portion of the push plate 280. The gate 286 is operated by one or more hydraulic cylinders, one end 288 of which is mounted to the push plate 280 and the other end of which is connected to the gate 286. The hydraulic cylinder 288 may be operated to move the gate 286 vertically toward and away from the blades 290 of the lift truck 220. Multiple gates 284, 286 may be used along the bottom edge of the push plate 280 if desired.

Where it is desired to use a load push lift truck 220 for pushing stacks of cartons 82 from pallets 30, the gate may be moved to its retracted position. When a stack of cartons is carried directly on the blades 290 of the lift truck 220, the gate may be lowered to ensure that the push plate is able to engage the bottom layer of the stack of cartons 82.

Of course, other methods may be used to provide variable clearance over the blades 290 of a load push lift truck. For example, the whole push plate 280 could be vertically movable with respect to the load push mechanism, or the load push mechanism itself could be vertically movable relative to the lift mechanism, or the blades of the lift truck could be lowerable (including by replacement of the blades) relative to the push plate 280. In any case, the variable clearance over the blades of a lift truck may permit the lift truck to be used both for depalletizing stacks of cartons 82 as well as for depositing the stacks of cartons in stowage locations. For lift trucks dedicated to depalletizing or stowage of stacks of cartons 82, an appropriate, fixed clearance of the push plate 280 over the blades 290 may be chosen.

The low profile of the cartons normally used for frozen animal products present challenges if sufficient clearance is not provided. In the case of pushing stacks of cartons from a pallet, too little clearance may result in the push plate 280 engaging the pallet rather than the stack of cartons 82. Too great a clearance, of course, may result in engagement of the push plate with the second layer of cartons in the stack 82, but not the first layer. This can result in sliding of the second and other layers of the stack of cartons 82 relative to the first layer.

While the present invention has been described with reference to various embodiments, it will be apparent to those skilled in the art that modifications may be made within the scope of the invention.

What is claimed is:

1. A method of depalletizing and lifting stacks of frozen animal products without the use of slip sheets comprising:
   positioning a first stack of cartons supported by a cargo pallet adjacent to a queuing location;
   sliding the first stack of cartons off the cargo pallet and into a first queuing location by applying a lateral force to the first stack of cartons;
   moving the first stack of cartons from the first queuing location to a first lifting location;
   positioning lifting apparatus at the first lifting location;
   applying a lifting force to the bottom of the first stack of cartons by means of the lifting apparatus to lift the first stack of cartons from the first lifting location.

2. The method of claim 1 wherein the lifting apparatus comprises a plurality of cargo slings.

3. The method of claim 1 wherein the lifting apparatus comprises the blades of a lift truck.

4. The method of claim 1 wherein the lateral force applied to the stack of cartons is applied by the push plate of a load push lift truck.

5. The method of claim 1 wherein the cartons are supported in the queuing and lifting locations by a low friction support.

6. The method of claim 5 wherein the low friction support comprises a plurality of rollers.

7. The method of claim 5 wherein the low friction support comprises a plurality of wheels.

8. The method of claim 5 wherein the low friction support comprises a plurality of bearings.

9. The method of claim 5 aligned for transporting the stack of cartons from the queuing position to the lifting location.

10. The method of claim 5 wherein the step of moving the stack of cartons from the queuing position to the lifting location is accomplished by the force of gravity.

11. The method of claim 5 wherein a lateral force is applied to the stack of cartons to move it from the queuing position to the lifting location.

12. The method of claim 5 further comprising the steps of:
    sliding a second stack of cartons off the cargo pallet and into a queuing location adjacent the queuing location of the stack of cartons;
    applying a lateral force to the second stack of cartons;
    moving the second stack of cartons from the queuing location to a lifting location adjacent the lifting location of the stack of cartons;
    positioning lifting apparatus at the lifting location;
    applying a lifting force to the bottom of the second stack of cartons by means of the lifting apparatus to lift the second stack of cartons from the second lifting location simultaneously with the applying of the lifting force to the first stack of cartons.

13. The method of claim 5 wherein the size of the first lifting location is sufficient to accommodate simultaneously at least the first stack of cartons and at least one other stack of cartons moved from the lifting location, and wherein the step of applying a lifting force to the bottom of the first stack of cartons further comprises applying a lifting force simultaneously to the bottom of the at least one other stack of cartons, whereby at least two stacks of cartons may be moved sequentially from the queuing location to the lifting location and may be simultaneously lifted from the lifting location.

14. The method of claim 13 further comprising the steps of:
    lifting the first stack of cartons and the at least one other stack of cartons into the hold of a ship and depositing them in a second queuing location;
    moving the first stack of cartons from the second queuing location to a second lifting location;

lifting the first stack of cartons from the second lifting location using a load push lift truck and transporting the first stack of cartons to a stowage location; and depositing the first stack of cartons in the stowage location.

15. The method of claim 14 wherein the first stack of cartons and the at least one other stack of cartons are supported in the second queuing and second lifting locations in the hold of the ship on a low friction support.

16. The method of claim 1 further comprising the step of restricting the pallet from movement into the queuing location during the step of sliding the first stack of cartons when lateral force is applied to the first stack of cartons off the cargo pallet.

17. A method for depalletizing a stack of cartons of frozen animal products comprising:

inserting the blades of a load push lift truck into the 4-way apertures of a pallet supporting a stack of cartons of frozen animal products and lifting the pallet and stack of cartons;

positioning the pallet and stack of cartons adjacent to a depalletizing location having a horizontal receiving surface and a vertical edge adjacent thereto such that the pallet abuts the vertical edge, the upper surface of the pallet not being lower than the upper surface of the depalletizing location;

pushing the stack of cartons off the pallet using the load push mechanism of the load push lift truck while retaining the pallet on the blades of the load push lift truck;

carrying the pallet to a pallet accumulation location on the blades of the load push lift truck;

depositing the pallet in the pallet accumulation location.

18. The method of claim 17 wherein the receiving surface is the upper surface of a stack of cartons of frozen animal products.

19. The method of claim 17 wherein the receiving surface is the upper surface of a depalletizer.

20. The method of claim 19 wherein the receiving surface is the surface of a queuing location on a roller deck.

* * * * *